(12) United States Patent
Ryan et al.

(10) Patent No.: US 11,258,776 B2
(45) Date of Patent: *Feb. 22, 2022

(54) SYSTEM AND METHOD FOR DETERMINING USE OF NON-HUMAN USERS IN A DISTRIBUTED COMPUTER NETWORK ENVIRONMENT

(71) Applicant: GiveGab, Inc., Ithaca, NY (US)

(72) Inventors: James Randall Ryan, Elgin, TX (US); Ruhul Alam, Austin, TX (US); James Edward Sylvana, Austin, TX (US); Conleth S. O'Connell, Jr., Austin, TX (US)

(73) Assignee: GIVEGAB, INC., Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,216

(22) Filed: Mar. 16, 2020

(65) Prior Publication Data
US 2020/0220855 A1 Jul. 9, 2020

Related U.S. Application Data

(63) Continuation of application No. 16/297,269, filed on Mar. 8, 2019, now Pat. No. 10,645,071, which is a
(Continued)

(51) Int. Cl.
*G06F 21/00* (2013.01)
*H04L 29/06* (2006.01)
(Continued)

(52) U.S. Cl.
CPC .............. *H04L 63/08* (2013.01); *G06F 21/30* (2013.01); *G06F 21/36* (2013.01); *G06F 21/554* (2013.01);
(Continued)

(58) Field of Classification Search
CPC ....... H04L 12/14; H04L 63/08; H04L 63/083; H04L 63/14; H04L 63/1416;
(Continued)

(56) References Cited

U.S. PATENT DOCUMENTS 6,847,953 B2 1/2005 Kuo
RE42,760 E 9/2011 Kuo
(Continued)

OTHER PUBLICATIONS

Office Action issued for U.S. Appl. No. 16/682,641, dated Mar. 31, 2021, 34 pages.
(Continued)

*Primary Examiner* — Josnel Jeudy
(74) *Attorney, Agent, or Firm* — Sprinkle IP Law Group

(57) ABSTRACT

Embodiments of systems and methods as disclosed herein may determine that an initiator of a communication on a distributed computer network is an automated script or the like. More particularly, in one embodiment, a web page including a hidden field may be generated in response to a request for the web page. This hidden field is a field included in the web page that is not visible to a human user when the web page is rendered by a browser and presented to the user. By comparing a received value for such a hidden field with an associated value for the hidden field as provided in the web page, the use of an automated script may be detected.

20 Claims, 18 Drawing Sheets

Related U.S. Application Data continuation of application No. 15/782,276, filed on Oct. 12, 2017, now Pat. No. 10,277,573, which is a continuation of application No. 15/426,792, filed on Feb. 7, 2017, now Pat. No. 9,819,667, which is a continuation of application No. 14/988,559, filed on Jan. 5, 2016, now Pat. No. 9,600,651.

(60) Provisional application No. 62/099,997, filed on Jan. 5, 2015, provisional application No. 62/099,989, filed on Jan. 5, 2015, provisional application No. 62/099,998, filed on Jan. 5, 2015, provisional application No. 62/099,995, filed on Jan. 5, 2015.

(51) Int. Cl.
| | | |
|---|---|---|
| *G06F 21/36* | (2013.01) | |
| *G06F 21/55* | (2013.01) | |
| *G06Q 20/40* | (2012.01) | |
| *G06F 21/30* | (2013.01) | |
| *G06Q 20/10* | (2012.01) | |
| *G06Q 30/00* | (2012.01) | |
| *G06Q 20/38* | (2012.01) | |
| *G06Q 30/02* | (2012.01) | |

(52) U.S. Cl.
CPC ......... *G06Q 20/10* (2013.01); *G06Q 20/4016* (2013.01); *G06Q 20/4018* (2013.01); *G06Q 30/0185* (2013.01); *H04L 63/083* (2013.01); *H04L 63/14* (2013.01); *H04L 63/1416* (2013.01); *H04L 63/1491* (2013.01); *G06F 2221/2133* (2013.01); *G06Q 20/382* (2013.01); *G06Q 30/0279* (2013.01)

(58) Field of Classification Search
CPC ............. H04L 63/1491; H04L 12/1453; H04L 2209/56; H04L 9/00; G06F 21/30; G06F 21/36; G06F 21/554; G06F 2221/2133; G06Q 20/10; G06Q 20/4016; G06Q 20/4018; G06Q 30/0185; G06Q 20/382; G06Q 30/0279
USPC .......................................................... 726/7
See application file for complete search history.

(56) References Cited

U.S. PATENT DOCUMENTS

| | | | |
|---|---|---|---|
| 8,370,749 B2 | 2/2013 | Morse et al. | |
| 8,706,577 B2 | 4/2014 | Stringfellow | |
| 9,213,821 B2* | 12/2015 | Saxena | G06F 21/36 |
| 9,501,651 B2* | 11/2016 | Rapaport | H04L 63/08 |
| 9,600,651 B1 | 3/2017 | Ryan et al. | |
| 9,626,680 B1 | 4/2017 | Ryan et al. | |
| 9,819,667 B2 | 11/2017 | Ryan et al. | |
| 9,979,747 B2* | 5/2018 | Bailey | H04L 67/303 |
| 10,055,591 B1* | 8/2018 | Sharifi Mehr | G06F 21/31 |
| 10,277,573 B2 | 4/2019 | Ryan et al. | |
| 10,523,647 B2 | 12/2019 | Ryan et al. | |
| 10,645,071 B2* | 5/2020 | Ryan | G06Q 30/0185 |
| 2002/0099649 A1 | 7/2002 | Lee | |
| 2006/0218091 A1 | 9/2006 | Choy | |
| 2006/0282660 A1 | 12/2006 | Varghese | |
| 2007/0198410 A1 | 8/2007 | Labgold | |
| 2008/0217400 A1 | 9/2008 | Portano | |
| 2008/0222002 A1 | 9/2008 | Hu | |
| 2008/0235123 A1 | 9/2008 | Olliphant | |
| 2008/0301046 A1 | 12/2008 | Martinez | |
| 2010/0305993 A1 | 12/2010 | Fisher | |
| 2011/0112931 A1 | 5/2011 | Hu | |
| 2011/0196791 A1 | 8/2011 | Dominguez | |
| 2012/0054101 A1 | 3/2012 | Duggal | |
| 2012/0130853 A1 | 5/2012 | Petri et al. | |
| 2012/0166335 A1 | 6/2012 | Bakshi | |
| 2012/0195517 A1* | 8/2012 | Mittur | G06F 21/31 |
| | | | 382/254 |
| 2012/0203698 A1 | 8/2012 | Duncan | |
| 2013/0042311 A1* | 2/2013 | Broder | H04L 9/3271 |
| | | | 726/7 |
| 2013/0304637 A1 | 11/2013 | McCabe | |
| 2013/0339237 A1 | 12/2013 | Rich | |
| 2014/0058763 A1 | 2/2014 | Zizzamia | |
| 2014/0059659 A1 | 2/2014 | Parekh | |
| 2014/0108251 A1 | 4/2014 | Anderson | |
| 2015/0012430 A1 | 1/2015 | Chisholm | |
| 2015/0161744 A1 | 6/2015 | Polechtchouk et al. | |
| 2015/0278817 A1 | 10/2015 | Abifaker | |
| 2015/0365401 A1 | 12/2015 | Brown | |
| 2016/0005029 A1 | 1/2016 | Ivey | |
| 2016/0300233 A1 | 10/2016 | Van | |
| 2017/0012960 A1* | 1/2017 | Idika | G06Q 20/4016 |
| 2017/0034148 A1* | 2/2017 | Rapaport | H04L 63/08 |
| 2017/0061115 A1* | 3/2017 | Kalra | G06F 21/36 |
| 2019/0207923 A1 | 7/2019 | Ryan et al. | |
| 2020/0014500 A1 | 5/2020 | Ryan | |

OTHER PUBLICATIONS

Office Action for U.S. Appl. No. 14/988,557, dated Jul. 19, 2016, 24 pgs.

Office Action for U.S. Appl. No. 14/988,559, dated Jul. 25, 2016, 10 pgs.

Office Action for U.S. Appl. No. 15/426,792, dated Mar. 7, 2017, 12 pgs.

Office Action for U.S. Appl. No. 15/782,276, dated May 22, 2018, 6 pgs.

Office Action for U.S. Appl. No. 15/446,829, dated Apr. 2, 2019, 28 pgs.

Office Action for U.S. Appl. No. 16/297,269, dated Jul. 10, 2019, 7 pgs.

Kingston, John et al., Towards a Financial Fraud Ontology: A Legal Modelling Approach, Artificial intelligence and Law, 2004, 12:419-446.

Notice of Allowance for U.S. Appl. No. 16/297,269, dated Dec. 27, 2019, 5 pgs.

Notice of Allowance for U.S. Appl. No. 16/682,641, dated Aug. 3, 2021, 11 pgs.

* cited by examiner

| gateway_request 418 ▼ |
| --- |
| 🆃 id BIGINT(20) |
| ◇ date DATETIME |
| ◇ merchant_id BIGINT(20) |
| ◇ gateway_credentials_id BIGINT(20) |
| ◇ transaction_type VARCHAR(255) |
| ◇ amount BIGINT(20) |
| ◇ credit_card_id BIGINT(20) |
| ◇ reference_gateway_response_id BIGINT(20) |
| ◇ form_response_id BIGINT(20) |
| ◇ message TEXT |
| Indexes ▶ |

| gateway_response 420 ▼ |
| --- |
| 🆃 id BIGINT(20) |
| ◇ gateway_request_id BIGINT(20) |
| ◇ result_type VARCHAR(255) |
| ◇ date DATETIME |
| ◇ gateway_message VARCHAR(255) |
| ◇ recurring_token VARCHAR(255) |
| Indexes ▶ |

SYSTEM AND METHOD FOR DETERMINING USE OF NON-HUMAN USERS IN A DISTRIBUTED COMPUTER NETWORK ENVIRONMENT

CROSS-REFERENCE TO RELATED APPLICATION(S)

This application is a continuation of, and claims a benefit of priority under 35 U.S.C. 120 of the filing date of U.S. patent application Ser. No. 16/297,269 filed Mar. 8, 2019, entitled "SYSTEM AND METHOD FOR DETERMINING USE OF NON-HUMAN USERS IN A DISTRIBUTED COMPUTER NETWORK ENVIRONMENT," which is a continuation of, and claims a benefit of priority under 35 U.S.C. 120 of the filing date of U.S. patent application Ser. No. 15/782,276 filed Oct. 12, 2017, entitled "SYSTEM AND METHOD FOR DETERMINING USE OF NON-HUMAN USERS IN A DISTRIBUTED COMPUTER NETWORK ENVIRONMENT," issued as U.S. Pat. No. 10,277,573, which is a continuation of, and claims a benefit of priority under 35 U.S.C. 120 of the filing date of U.S. patent application Ser. No. 15/426,792 filed Feb. 7, 2017, entitled "SYSTEM AND METHOD FOR DETERMINING USE OF NON-HUMAN USERS IN A DISTRIBUTED COMPUTER NETWORK ENVIRONMENT," issued as U.S. Pat. No. 9,819,667, which is a continuation of, and claims a benefit of priority under 35 U.S.C. 120 of the filing date of U.S. patent application Ser. No. 14/988,559, filed Jan. 5, 2016, entitled "SYSTEM AND METHOD FOR DETERMINING USE OF NON-HUMAN USERS IN A DISTRIBUTED COMPUTER NETWORK ENVIRONMENT," issued as U.S. Pat. No. 9,600,651, which claims a benefit of priority under 35 U.S.C. 119 of the filing date of U.S. Provisional Patent Application No. 62/099,989, filed Jan. 5, 2015, entitled "SYSTEM AND METHOD FOR DETECTING SOURCES OF MALICIOUS PAYMENT CARD ACTIVITY USING AGGREGATE VIEWS OF GATEWAY RESPONSES," U.S. Provisional Patent Application No. 62/099,995, filed Jan. 5, 2015, entitled "SYSTEM AND METHOD FOR ENCODING FINANCIAL TRANSACTION COMMUNICATIONS," U.S. Provisional Patent Application No. 62/099,997, filed Jan. 5, 2015, entitled "SYSTEM AND METHOD FOR REVERSE CAPTCHA," and U.S. Provisional Patent Application No. 62/099,998, filed Jan. 5, 2015, entitled "SYSTEM AND METHOD FOR DETECTING AND COMMUNICATING WITH SOURCES OF MALICIOUS PAYMENT CARD ACTIVITY," which are all fully incorporated by reference herein for all purposes.

TECHNICAL FIELD

This disclosure relates generally to evaluating, and responding to, communications that arise in the context of a distributed computer based network. Specifically, embodiments disclosed herein relate to determine that initiators of such communications may be potentially associated with an automated script or the like.

BACKGROUND

Increasingly, commerce and other exchanges that involve payment transactions such as those occurring in conjunction with commerce or charity or nonprofit organizations have moved into the online world. For example, online fundraising is now a significant portion of the fundraising and capital campaigns of many nonprofit organizations. The implementation of these payment transactions in the online world has given rise to specific problems that occur as a consequence of the fact that such payment transactions now take place in the context of, and utilizing communication that travel over, these highly distributed computer networks.

Typically, a distributed computer environment in which monetary transfers is made include computers belonging to an organization, such as a for-profit or not-for-profit business or association (collectively referred to herein as a merchant) coupled to one or more separate payment gateway computers over a network, most often the Internet. These payment gateways are entities that are application service providers that authorize credit card transactions and conduct or facilitate settlement between participating institutions (e.g., banks, credit unions, etc.). User computing devices such as a personal computer, laptop computer, mobile phone or other computing device, are also coupled to the network.

In many cases, the merchant computers may provide a site comprised of various web pages or other content (collectively, "web page") which the user can access over the network utilizing a browser or application (e.g., "app") executing on his device. At least one of those web pages includes a portion of a page (which may be an entire page, pop-up, frame, div, iframe, etc.) through which the user may initiate a payment transaction when the page is rendered at the user's device by the browser. These payments can be made in exchange for goods or services, can simply be donations, or can be made for other reasons.

A payment gateway or separate payment system may host a secure payment interface (e.g., web page, application programming interface (API), etc.) through which the initiated payment may actually be completed. Thus, when the user accesses the web page from the merchant utilizing his browser, the user interacts with the payment portion of the page for example, by activating a payment control (e.g., a payment button). The user may also optionally enter personal or payment-related information within this portion of the page. When all required personal and/or payment-related information is entered, the user may provide a further input, such as selection of a "submit" button, to signify readiness to actually complete the payment transaction.

In response to receipt of the input signifying user readiness to complete the payment the browser can then be redirected to a secure payment web page hosted on the payment gateway server. In performing the redirection, the user-entered personal or payment-related information may also be transmitted to the payment web page hosted by the payment gateway.

In many cases, following the redirection, the user completes the payment by interacting with the payment gateway's web page. For example, the user may enter credit card information or bank account and routing information through the payment interface in order to complete the payment. The payment gateway server typically confirms completion of the financial payment by the user by serving to the user's browser a confirmation page.

When making an online payment such as that described above, users have two primary concerns, namely, security and authenticity. Security is a concern because users do not want their private personal or financial information intercepted and misused. Authenticity is also a concern because users want payments to be received by the intended merchant rather than an unknown third party. The conventional payment infrastructure described above attempts to address these concerns through authentication with a "trusted" third party that is presumed to be viewed as reliable by users. In many cases, the "trusted" third party provides a badge or seal. Users can allay concerns regarding the authenticity of the party hosting sub-window by clicking on the badge or seal to establish communication with the "trusted" third party over network to enable confirmation of the authenticity of the party.

SUMMARY

As a result of at least the problems discussed above, certain methods and systems have been developed that utilize a service provider within the distributed computer network to provide a form (such as a payment form or the like) that can be seamlessly integrated into a merchant's web page (e.g., which appears as a portion of, or in conjunction with the merchant's web page, or has the same look and feel as the merchant's web page). A user can utilize the form to submit required payment information. The service provider can then submit the payment information to the payment gateway to perform the monetary transfer, receive a result from the payment gateway (e.g., approved, denied or some other condition) and provide a result to the user through the merchant's web page. In this manner, both the user's fears about security and authenticity and any concerns about increasing the friction involved in a monetary transfer are allayed, as such a form is integrated into the merchant's site in a seamless manner, giving the user both the appearance and the convenience of providing all payment information through the merchant's site.

Such functionality may, however, not specifically address all the concerns of merchants with respect to these payment transactions. In the industry, concerns of the merchant are focused additionally on fraud. Frequently, web pages that provide the ability to initiate payment transactions by entering payment information are targeted by scammers attempting to ascertain the validity of payment information such as credit card numbers, bank account or routing numbers, etc. These online payment mechanisms are attractive to fraudulent user because unlike in person transactions, automated teller machines (ATMs) and even gas pumps, multiple cards can be submitted and evaluated anonymously. There are no security cameras, clerks present, or recording of the transaction. Additionally, with the increasing presence of cloud service providers, servers can be cheaply "rented" and used for evaluating a large number of credit cards and may even be used as a proxy that hides the real identity of the fraudulent user.

In particular, online fundraising campaigns are frequently targeted by scammers seeking to determine if particular (often stolen) credit card numbers and supporting information (name, expiration date, address, zip code, etc.) are valid. This situation arises in the case of non-profit organizations for a variety of reasons. Unlike for-profit retailers, non-profits are attempting to gain as many funds as possible to deliver their mission. Their payment form are usually open-ended on amounts they will accept and there is no need to bother creating a dummy shopping cart (as with retailer sites). Furthermore, there is usually no "shipping address" that needs to be managed. Accordingly, it is easier to submit a large number of credit cards through such forms and create automated scripts that may do the same.

These scammers usually obtain credit card numbers and possibly other associated information. The scammers then attempt to ascertain or verify a complete set of payment of information corresponding to the credit card number. Typically, this is done using automated scripts. These automated scripts may initiate a request for a payment transaction of a nominal sum (e.g., less than ten dollars) to the service provider (e.g., through the form or an associated API offered by the service provider to submit payment information) where the request includes a combination of payment information (e.g., credit card number, CCV code, address zip code, name, etc.). The automated script then records whether the initiated payment transaction for that set of payment information was successful. A scammer may then sell the payment information for which transaction is successful to another party who may then fraudulently utilize the payment information in another setting for potentially a much greater amount of money.

As the number of permutations for payment information is exceedingly high, scammers may utilize these types of automated scripts to run through hundreds, if not thousands, of combinations of payment information before a single transaction goes through and the card is deemed valid and thus available for further fraudulent use. This methodology means that for every payment transaction that goes through, thousands of other payment transactions may be denied. In other words, the payment gateway to which the service provider submits that payment information may return a notification (e.g., a code or the like) that the payment transaction request has been denied.

While such a denial serves to protect the legitimate holder of the credit card and the banks that would have been involved in any actual transfer of funds, these denials significantly impact the merchants themselves. Despite the fact that the merchant receives no money in accordance with a denied payment transaction, it is still charged a fee by the payment gateway for processing the transaction. Accordingly, in the case where automated scripts are utilized to iterate through thousands of combinations of payment information the accumulated fees for the denial of these thousands of attempted payment transactions may be significant, running into the tens, if not hundreds, of thousands of dollars.

For any organization, especially a non-profit organization, the amount of these denial fees can be debilitating. In particular, given the budgets of most non-profit organizations the aggregate amount of these denial fees may reduce the effectiveness of the organization in accomplishing their eleemosynary mission.

While mechanisms are in use at the web pages of merchant organizations to prevent such automated script attacks, these often provide impediments or "friction" which may deter legitimate potential donors. For example, a system called "Completely Automated Public Turing test to tell Computers and Humans Apart" (CAPTCHA) requires a user to identify an image or text and enter corresponding information into an entry window. If the image or text matches the typed information, then the user is deemed a human user (i.e., not a script) and may proceed. Often however, such images or text are indecipherable and require more than one entry. In this case, a legitimate potential donor is likely to simply give up and the nonprofit has lost the potential donation.

Even when CAPTCHA text and images are decipherable, however, it has been found that they present an impediment in part because they an additional step not related to desired transaction, thus causing "friction." According to some studies, the likelihood of a first time donor making a donation falls fifty percent per additional screen he has to navigate.

Moreover, scammers are now utilizing automated scripts that are sophisticated enough to pull text data out of CAPTCHA images to enter into the CAPTCHA field. To combat this, the CAPTCHA images have become more complex, creating a vicious cycle of ever increasing image complexity (and thus ever increasing user difficulty). Additionally, the user of CAPTCHA images may present an impediment to a blind user, an auditory reading of the CAPTCHA data may present an impediment to use of the web site by a deaf user, etc.

What is desired then, is a way to pro-actively determine that a user may be potentially associated with fraudulent activity such as a user who is (or utilizes) an automated script or the like. In this manner, any charges or other undesirable effects resulting from submission of a fraudulent payment transaction may be substantially ameliorated.

To those ends, among others systems and methods as presented herein may configure a web page (or a form appearing therein) that determines that users are an automated script. More particularly, in one embodiment, a web page including one or more "invisible" or hidden questions (or fields) may be generated in response to a request for the web page. These invisible or hidden fields are fields included in the code of the web page that are not visible to a human user when the web page is rendered by a browser and presented to the user. While not visible in the rendered web page being presented to the user (and thus not requiring any attention or input by the user), such invisible fields may nevertheless be identified by an automated script processing the code of the web page (e.g., identified by the automated script as a field that needs to contain a value or a value of a particular type).

If a value (or incorrect, different, etc. value) for such an invisible field is received through a web page including such an invisible field the user interacting with the web page may be identified as potentially fraudulent (e.g., it may be an automated script). Embodiment of these techniques are thus referred to as "reverse CAPTCHA" as, rather than requiring a user to verify themselves as human as in CAPTCHA, embodiments allow the user to implicate itself as an automated script.

In particular, in one embodiment a web server computer may receive a request for a web page, determine a reverse CAPTCHA field and an associated value and provide the web page with the reverse CAPTCHA field in response to the request. The reverse CAPTCHA field is configured such that it is not visible in a visual presentation of the web page and the field has an associated value. A response to the web page including a received value associated with the reverse CAPTCHA field may be received at the web server. The web server can determine an expected value of the reverse CAPTCHA field and compare the expected value with the received value to determine if the response has been provided by an automated script.

In some embodiments, the web page may be modified to include the reverse CAPTCHA field and the reverse CAPTCHA field is selected randomly based on a set of reverse CAPTCHA rules.

In an embodiment, the associated value and the expected value are determined algorithmically. The value may be an empty value and the reverse CAPTCHA field is configured to be hidden, displayed beneath an element of the web page, or displayed offscreen.

In one particular embodiment a server computer coupled to a plurality of user devices and a plurality of payment gateways through a computer network includes a form generation engine, a transaction processing engine and a reverse CAPTCHA analysis engine. The form generation engine receives a form request from a user device over the computer network in association with a web page of a merchant organization including a widget and provides a form definition to the user device over the computer network in response to the form request. Based on this form definition a form having one or more fields for entering payment information is presented to a user in the web page at the user device when the form definition is rendered by the widget. The form also includes one or more reverse CAPTCHA fields having an associated value, where the reverse CAPTCHA field is not visible in a visual presentation of the form. Form definition data including an identifier associated with the reverse CAPTCHA field is stored at the server.

The transaction-processing engine receives a form response over the computer network. The form response was sent using the form and includes payment information for a requested payment transaction and a received value for the reverse CAPTCHA field. The form response data can be stored at the server.

The reverse CAPTCHA analysis engine generates an expected value for the reverse CAPTCHA field based on the identifier associated with the reverse CAPTCHA field in the form definition data, determines the received value for the reverse CAPTCHA field from the form response data and compares the expected value with the received value. If the received value and the expected value do not match the payment transaction is identified as fraudulent and a fraud prevention response form can be generated without submitting the payment transaction to a payment gateway.

It will be noted that while certain embodiments as discussed herein have been described in conjunction with form response submitted through interaction with a web page presented in a browser other embodiments of the systems and methods presented herein may be equally effectively utilized in the context of responses submitted through other methods such as an Application Programming Interface (API), a web services interface or through a dedicated application (such as an "app" utilized on a mobile device such as a smartphone or the like). All such embodiments and uses are fully contemplated herein. Moreover, it will further be noted that while certain embodiments as discussed herein have been discussed in conjunction with a service provider for payment transactions, embodiments of the systems and methods disclosed herein may be equally effectively utilized in other contexts in a distributed network computer architecture. For example, reverse CAPTCHA may be utilized in almost any web page desired to determine if a response to such a web page has been submitted by an automated script or the like.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIGS. 4A-4D are diagrammatic representations of an embodiment of a schema that may be utilized with embodiments as discussed herein.

FIG. 10 is a diagrammatic representation of a web page including a reverse CAPTCHA field.

DETAILED DESCRIPTION

Figure 1:
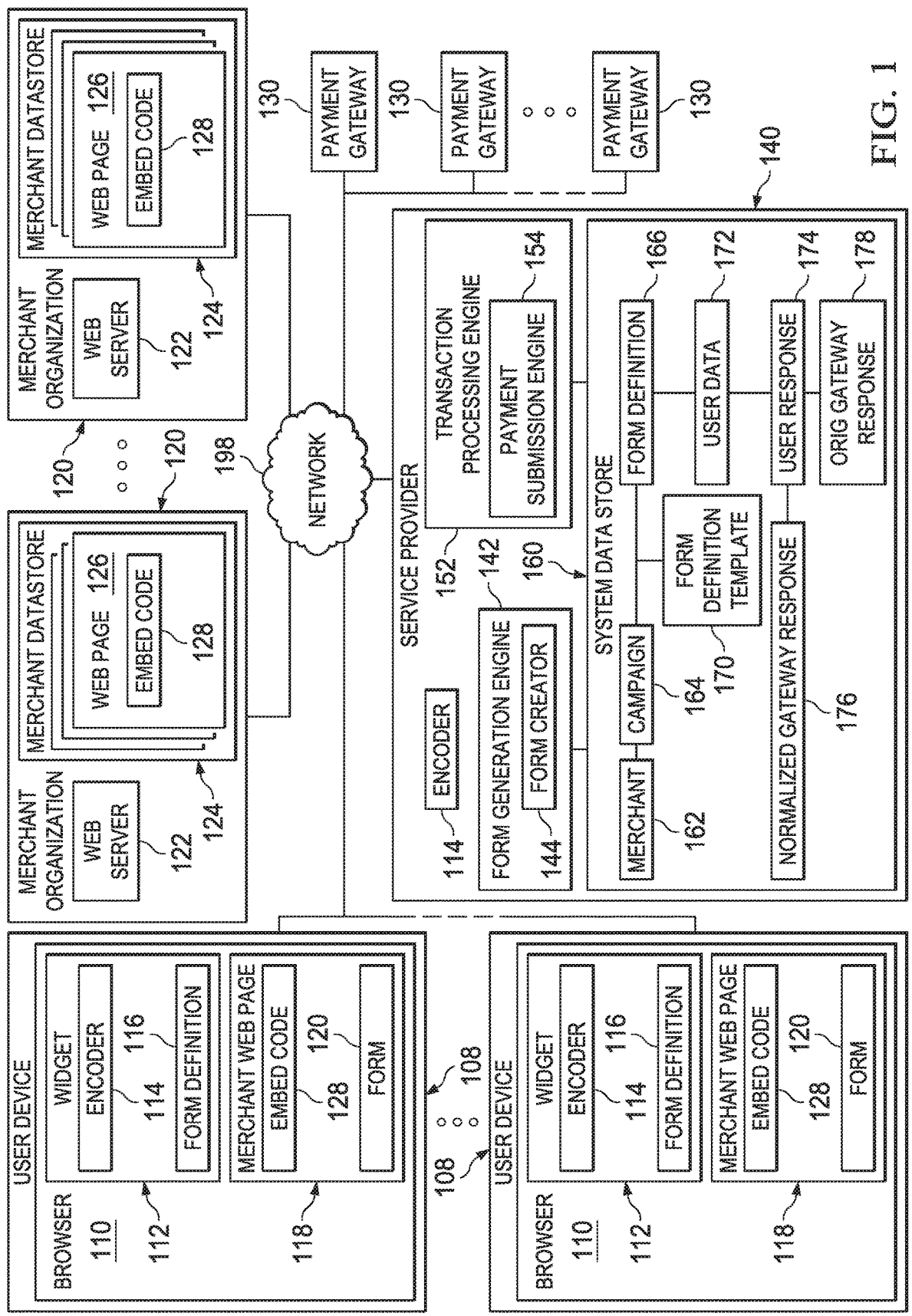
FIG. 1 is a diagrammatic representation of an architecture including an embodiment of a service provider system.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail a brief description of the context in which embodiments can be utilized may be helpful. As mentioned above, methods and systems have been developed that utilize a service provider within a distributed computer network to provide a form (which may include almost any type of displayed content, whether or not that content includes data fields that may be filled out or completed by a user) that can be seamlessly integrated into a merchant's web page. A user can utilize such a form to submit payment information. The service provider can then submit the payment information to the payment gateway to perform the monetary transfer, receive a result from the payment gateway (e.g., approved, denied or some other condition) and provide a result to the user through the merchant's web page.

Merchant's web sites that provide the ability to initiate payment transactions are, however, often the target of scammers (whether or not forms from a service provider are used to implement the payment transaction functionality of the merchant's web site). Scammers typically use automated script to initiate payment transactions for thousands of permutations of payment information (e.g., credit card numbers, CCV codes, address, zip code, cardholder name, etc.) and record which permutations of payment information result in a successful or completed payment transaction.

Each of these payment transactions is submitted to a payment gateway which returns an indicator of a successful transaction, a denied transaction or another type of indicator. To determine whether to approve or deny a transaction, payment gateways may employ risk scoring. However, such risk scoring is often proprietary and consequently leaves the online commerce market with an inconsistent approach. If merchant A chooses one gateway, which has a strong risk scoring capability, but merchant B chooses another gateway with less rigorous scoring (such as, e.g., by not tracking the originating IP address of the submission), users could be more at risk with merchant B. Additionally different merchants may have different settings even when utilizing the same payment gateway. Two common examples are merchants may disable address verification checks by the gateway to reduce the number of declines issued by the gateway for transactions associated with the merchant, and some merchants may not to turn on the CCV security check.

Moreover, the merchant may be charged a fee by the payment gateway for each denied transaction regardless of the scoring methodology or other reason employed by a payment gateway. What is desired then, is a way to proactively determine that an online payment transaction may be fraudulent before it is submitted to the payment gateway. In this manner, any charges or other undesirable effects resulting from submission of a fraudulent payment transaction (e.g., to a payment gateway) may be substantially ameliorated.

To those ends, among others, attention is now directed to embodiments of the systems and methods presented herein. In particular, service providers that provide forms for submission of payment transactions may leverage their location in the distributed computer environment to implement proactive threat detection based on an aggregate view of payment transactions in that distributed computer network. In some embodiments, the inventive systems and methods provide for aggregate threat assessment and analysis of online payment transactions, and responses thereto, based on analysis of aggregated data obtained from across the distributed computer network in accordance with other online payment transactions.

Specifically, embodiments of such systems and methods may operate in conjunction with a service provider that provides forms (including payment forms) to a number of different merchants affiliated with a number of different payment gateways and submits payment information to a number of different payment gateways in association with those payment transactions. The data associated with the completed payment transactions (e.g., those that were submitted to the payment gateway, irrespective of whether the transaction succeeded or failed) can be stored.

This aggregated data can be analyzed using a number of fraud prevention (FP) rules, where each rule evaluates the aggregated data based on an associated pattern to determine zero or more identifiers associated with that FP rule.

The list of identifiers generated by each of the FP rules can be used by the system in the analysis of incoming payment transaction requests. More specifically, embodiments may determine data associated with an incoming payment transaction request for one or more of the FP rules and compare this determined data with the lists of identifiers generated by application of those FP rules to the aggregated data. If the data determined from the received payment transaction request matches an identifier on the lists of identifiers corresponding to the FP rules, a threat may be detected. In such cases, the payment transaction may not be sent to the payment gateway.

Additionally, certain embodiments may determine a response (e.g., a form) to send to the user from which the payment transaction request was received. Such a response may be an indication of transaction success, a denial of the transaction without a cause, a denial with a cause of incorrect information provided, an undetermined response, (e.g., not related to the validity of the payment information such as a system error), or some other response. In this manner, scammers utilizing a merchant's web site for the validation of payment information may be kept unaware both that their payment transaction request was never actually evaluated and the actual validity of the payment information. Choosing certain responses may raise the effort threshold required by these scammers to utilize a merchant's web site for payment information validation and cause them to cease those activities, or at least to cease utilizing the merchant's web site for such activities. This procedure of "scamming the scammers" will thus have the effect of deterring future uses of the merchant organization's web site for credit card or other types of fraud.

Turning now to the drawings, and with particular attention to FIG. 1, a diagram of an architecture of a distributed network computer system for conducting online payment transactions that includes an embodiment of a service provider system is disclosed. Service provider 140 is coupled to user devices 108 and merchant organizations 120 and payment gateways 130 over network 198. The network 198 may be the Internet, a wide area network (WAN), a local area network (LAN), an intranet, an internet, a wired network, a wireless network (including a cellular network), or some combination thereof.

Merchant organization 120 may be a for-profit or non-profit organization that, as part of its operations, needs to conduct online payment transactions. Such an organization may be, for example, a nonprofit attempting to raise money through donations. Another merchant organization might be a social media site selling goods that celebrities discuss in their posts. Yet another might be a racing event promoter taking registrations and selling related merchandise. Other types of merchant organizations 120 are possible and contemplated herein.

To facilitate interaction with users and conducting online payment transactions with these users, the merchant organization 120 may include a web server 122 and one or more web pages 126 in an associated data store 124. Such web pages 126 may explain their mission, offer items for sale, solicit donations, etc. In particular, at least one web page 126 used for conducting payment transaction may be a web page through which the user may provide payment information, as will be explained in more detail later. Users may access these web pages 126 through a browser 110 on user devices 108. These user devices 108 may be, for example, personal computers, laptop computers, mobile phones, watch or other wearable, or other data processing device and may include a processor, a display (virtual or physical) and a user interface.

In cases where merchant organization 120 is a non-profit or charitable organization, the merchant organization 120 may conduct discrete campaigns whereby donations may be solicited in conjunction with an event, time period, goal, etc. Each of these campaigns may have certain associated web pages 126, or a particular look and feel for one or more of the web pages 126, etc. It will be understood that while embodiments herein may be described with respect to campaigns, embodiments will be equally applicable to merchant organizations and web pages that do not utilize such campaigns to solicit donations or otherwise conduct online payment transactions. While a web page 126 of the merchant organization 120 solicits donations, merchant organization 120 may utilize service provider 140 to provide a portion associated with the web page 126 that allows a user to submit the actual payment information required for such a donation (e.g., a name, credit card or bank information, amount, and the like).

Service provider 140 includes a system data store 160 that includes merchant data 162 (such as an object, data in a table, etc.) for a merchant organization 120. This data may include an identifier for the merchant organization 120 along with other data pertaining to the merchant organization 120. The merchant data 162 is associated with data 164 for each campaign that merchant organization 120 (represented by merchant data 162) is conducting, where such data 164 may include an identifier for each of the campaigns being conducted by merchant organization 120. The data 164 for a campaign is in turn associated with one or more form definition templates 170.

Each form definition template 170 may be associated with a unique identifier and define the data that may be used in the construction of a form definition such as the pages, sections, questions (e.g., what fields, types and labels of traditional form data to be entered), encoding, prefill data (e.g., what questions should be pre-filled with data if possible) along with other options or other definitions. These form definition templates 170 may be at least partially defined by the merchant organization 120 to obtain the data desired by the merchant organization or needed by a payment gateway 130 associated with the merchant organization 120 or a campaign of that organization 120. Additionally, the form definition template 170 or campaign data 164 may be associated with a style definition (e.g., a cascading style sheet (CSS) or the like) that defines an appearance of a form created for the campaign or created from the form definition template 170.

One or more web pages 126 provided by the merchant organization 120, including those through which payment information is to be obtained, may include an embed code 128. This embed code 128 can cause the web browser 110 rendering the merchant organization's web page 126 to request a widget 112 from service provider 140 (e.g., if the widget 112 is not already present or executing on the user device 108). The embed code 128 may comprise a script tag, an include tag or the like. The widget 112 may include code such as JavaScript or the like, which may be executed by the browser 110 at the user's device 108. The embed code 128 may also contain a form identifier corresponding to a form definition template 170 (which may be appropriate for a campaign being conducted by the merchant organization 120 associated with that web page 126). The widget 112 sends a request for the form identifier contained in the embed code 128 to the service provider 140. The widget 112 may also create a unique user identifier associated with user device 108 or a user on the user device 108, and provide that user identifier with the form identifier in the request to the service provider 140. Further details pertaining to embodiments of a widget may be understood with respect to U.S. Pat. No. 8,370,749, entitled Secure Online Communication Through a Widget on a Web Page, to Morse et al, issued on Feb. 5, 2013 and hereby incorporated by reference in its entirety as if fully set forth herein.

Service provider 140 may therefore receive requests for forms from widget 112 where the requests include a form identifier or a user identifier. The service provider may store user data 172 including the user identifier and other data associated with the request (e.g., data that may be determined about the request such as IP address, browser type, language, encoding, etc.) in the data store 160. Service provider 140 may also provide the form request to form generation engine 142. Form generation engine 142 may determine the form definition template 170 associated with the form identifier contained in the request.

Form creator 144 may access data store 160 to obtain the form definition template 170 associated with the form identifier contained in the form request received from the widget 112. The form creator 144 may process the form definition template 170 to generate a form definition 116. Specifically, the form creator may use the form definition template 170 (and possibly any data 172 in the data store 160 about the user) to generate the form definition 116. The form creator 144 may determine which questions to include in the form, which of those questions to prefill with data if it is available (and what data to utilize), globalization or internationalization data, or other data to create the form definition. The form definition 116 can thus include JavaScript Object Notation (JSON) data that may be used to define a form. Additionally, the form definition may include one or more CSS style sheets that may be used in the rendering of the form definition 116.

Once the form definition 116 is created by the form creator 144 it is returned to the requesting widget 112 at the user device 108 in response to the form request. Additionally, the form generation engine 142 stores data 166 for the created form definition 116 in the data store 160 at the service provider 140 in association with the user data 172 and the form definition template 170. This form definition data 166 may include data on the questions, prefill, style, etc. of the form definition 116 that was sent to the widget 112 at the user's device 108 in response to the request.

When the widget 112 receives the form definition 116 in response to the form request, it processes the form definition 116 to render form 132 in the rendered web page 118 presented in the browser 110. It should be noted here, that the term form as used herein is being used in a generic sense as content, regardless of whether the from 120 as presented in the browser 110 includes fields into which values may be entered by a user or does not include such fields.

In cases where the user is intended to enter payment information utilizing the rendered web page 118, the form 132 may be a payment form that includes a set of questions (e.g., fields) into which the user may enter payment information such as card information, a card verification value (CCV) number, a name, address, zip code, amount, etc. The form data, including the payment information entered by the user, may be returned to the service provider 140. In particular, the form data, including the payment information entered by the user into the form 132 presented through the browser 110 may be received by the widget 112 and returned to the service provider 140 using, for example, an HTTP POST or GET over SSL.

In one embodiment, communications between the service provider 140 and the browser 110 or the widget 112 may be done via secure socket layer (SSL). However, such a link may still be susceptible to a sophisticated man in the middle attack in a wireless access point, for example. Accordingly, in certain embodiments, at least a portion of the form response from the widget 112 to the service provider 140 may be a packed or encoded (collectively encoded) value, created for example, using a hash, encryption or a binary code. In this way, a man in the middle (or other) attacker will not be able to read the encoded data. So, instead of passwords, credit card numbers, CCV numbers, or other sensitive data being in clear text within the encrypted SSL tunnel, such data may be contained in the packed or encoded value that is passed. The widget 112 and the service provider 140 are therefore provided with respective encoder software modules 114 that may encode or decode the value using for example a hashing algorithm, encryption or binary coding such that the form data or a portion thereof may be encoded before transmission.

Thus, in some embodiments, widget 112 includes encoder 114 for performing the encoding or decoding process. When widget 112 is executed at the browser 110, encoder 114 implements encoding such that values input by the user into form 132 may be encoded using the predetermined encoding before they are communicated to the service provider 140 in a form response. The corresponding encoder 114 at the service provider 140 may decode any encoded values to retrieve the original values. For example, zero, one or more, or all, values, of the form data may be encoded. Further, in some embodiments, different encodings may be applied to different values input into the different fields of the form 132. As the widget 112 is controlled and delivered by the service provider 140 it may be relatively easy to change the encoding scheme utilized by encoder 114 further making the observation of encoded values passed between the user device 108 and the service provider 140 more difficult.

Once the form response data, including the payment information entered by the user, is returned to the service provider 140 (and decoded in cases where any values of the form data are encoded), this user response 174 (also known as a form response) including the form data may be stored in the data store 160 in association with the user identifier 172 and form definition 166 originally sent to the user. Additionally, data, such as metadata, cookie data, or other data communicated during a network communication session, such as an IP address, browser identity, campaign identifier, organization identifier, e-mail address, user identifier, etc., that are additionally communicated to the service provider 140 with the response from the widget 112 are stored in the user response 174. Moreover, in some embodiments, widget 112 may contain or utilize an analytics module that tracks a user's interaction with the form 132. Accordingly, analytics data associated with a user's interaction with the form 132 may also be communicated to the service provider (by widget 112 or otherwise). This analytics data may also be stored in association with user response 174.

Thus, from the data in data store 160 it is possible to determine for each campaign 164 for each merchant 162, the users who interacted with the campaign using associated user identifiers 172, the form definitions sent to those users (e.g., form definitions 166 associated with user identifier 172, and form definition templates 170) and the user's response to the presented form (e.g., user response 174). The service provider 140 may perform a validation process on the form response against the form definition 166 that was stored by the form generation engine 142 to ensure answers correspond to the questions asked, for example, and potentially other checks with backend payment networks or reputation providers on the cardholder info, or address verification with US Postal service. The service provider may also perform a pricing check to ensure there is something to charge. If a discount has been applied, a best practice may be to not perform a $0 transaction as that would cost the merchant a transaction fee on $0.

The received payment information and any other desired form data may be provided to transaction processing engine 152. The transaction processing engine 152 determines a payment gateway 130 associated with the campaign or merchant associated with the received form response using the data in data store 160 (e.g., by accessing the campaign 164 or merchant 162 data in data store 160 to determine an identifier of an associated payment gateway 130). Payment submission engine 154 then generates a request to perform this payment transaction for the associated payment gateway 130 according to the interface provided by that payment gateway 130. This request includes the data required by the payment gateway 130, including for example, the credit card number, bank account or routing number, CCV number, address, amount, zip code, etc. In one embodiment, the payment submission engine 154 includes a Java Messaging Services (JMS) queue and a JMS consumer. The request is a message placed on the queue, the consumer obtains messages from the JMS queue and dispatches the message to the corresponding payment gateway 130.

The payment gateway 130 includes one or more server computers associated with a payment service, such as Paypal, Cybersource, Auth.net, TSYS, First Data, and the like. The payment gateway 130 processes the credit card or bank account according to the received payment transaction request and returns one or more transaction codes or other data. These transaction codes identify the result of payment gateway 130 attempting to perform the requested payment transaction, including for example, whether the card is declined, whether there is a hold, whether the payment transaction was approved, etc. Such transaction codes are unique and proprietary to each payment gateway 130 (or payment service that operates the payment gateway 130). If the transaction is approved, the payment gateway 130 will arrange for funds to be deposited with a payment settlement server, typically, a bank or credit union or other type of card network provider.

Accordingly, the payment submission engine 154 may receive a response form the payment gateway 130 in response to a submitted request for a payment transaction. Data 178 from the received payment gateway response, including the proprietary transaction code or other data received from the payment gateway, can be stored in the data store 160 by the transaction processing engine 152. The original payment gateway response data 178 stored is associated with the user identifier 172 of the user who initially requested the payment transaction through the form 132, the form definition sent to that user (e.g., form definition 166 associated with the user identifier 172 and form definition template 170), and the user's response to the presented form (e.g., user response 174).

Additionally, transaction processing engine 152 may normalize the original payment gateway response to one or more codes specific to the service provider 140. In particular, the transaction processing engine 152 may normalize the proprietary transaction code provided by the payment gateway 130 in response to the payment transaction request to a normalized transaction code utilized by the service provider system 140. These normalized codes will thus allow responses from a number of different payment gateways 130 that each may use different proprietary transaction codes to be standardized into a set of normalized transaction codes used by the service provider system 140. Transaction processing engine 152 may thus identify a payment gateway 130 from which the response was received and access instructions for determining a normalized transaction code for a proprietary code from that payment gateway 130.

Embodiments thus identify payment gateway 130, and an original transaction code and determine a corresponding normalized code. For example, for a payment gateway 130 a return code for a decline due to an unsupported card may be 2024; in some embodiments, this is normalized to DECLINE_UNSUPPORTED_CARD:

```
case 2024: // Card Type Not Enabled
    return ResultType.DECLINE_UNSUPPORTED_CARD;
```

In a different payment gateway 130, the original transaction code returned for a decline due to an unsupported card is 17; this is normalized to the same DECLINE_UNSUPPORTED_CARD.

```
case 17:
    return ResultType.DECLINE_UNSUPPORTED_CARD;
```

Additional examples are set forth below. It is noted that more codes and different normalizations are possible.

```
case 5: // Valid amount is required
    return ResultType.PLATFORM_ERROR;
case 11: // Duplicate Transaction
    return ResultType.PLATFORM_ERROR;
case 13: // Bad credentials
    return ResultType.ORGANIZATION_ERROR;
case 37:
    return ResultType.DECLINE_INVALID_CARD_NUMBER;
case 46: // Timeout
    return ResultType.COMMUNICATION_ERROR;
```

Once the original transaction code or other data received from the payment gateway 130 is normalized, normalized gateway response data 176 including the normalized transaction code is stored in the data store 160 by transaction processing engine 152. The normalized payment gateway response data 176 is thus associated with the original payment gateway response data 178, the user identifier 172 of the user who initially requested the payment transaction through the form 132, the form definition sent to that user (e.g., form definition 166 associated with the user identifier 172 and form definition template 170) and the user's response to the presented form (e.g., user response 174).

The service provider 140 may then communicate one or more response messages to the user via the widget 112 based on the response received from the payment gateway 130. In particular, the service provider 140 may create a form definition for the response message using a form definition template 170 (or another form definition template utilized by service provider 140 not specifically associated with the merchant 162 or the campaign 164) and return this response form definition to the widget 112, where it is rendered by the widget and presented to the user at the user device 108. The newly rendered form may, for example, replace form 120 previously presented to the user, may be rendered in a pop-up window, etc. This response message may include an indication of success, a decline, a prompt for additional or different information, a thank you or some other response message entirely, and it may be rendered in a pop-up window, etc. It will be noted here, and will be discussed in more detail later, that the response message returned by the service provider 140 to the user is not necessarily congruent or does not necessarily (i.e., it may or may not) correspond with the type of response received from the payment gateway 130 or normalized by the service provider 140.

Figure 2:
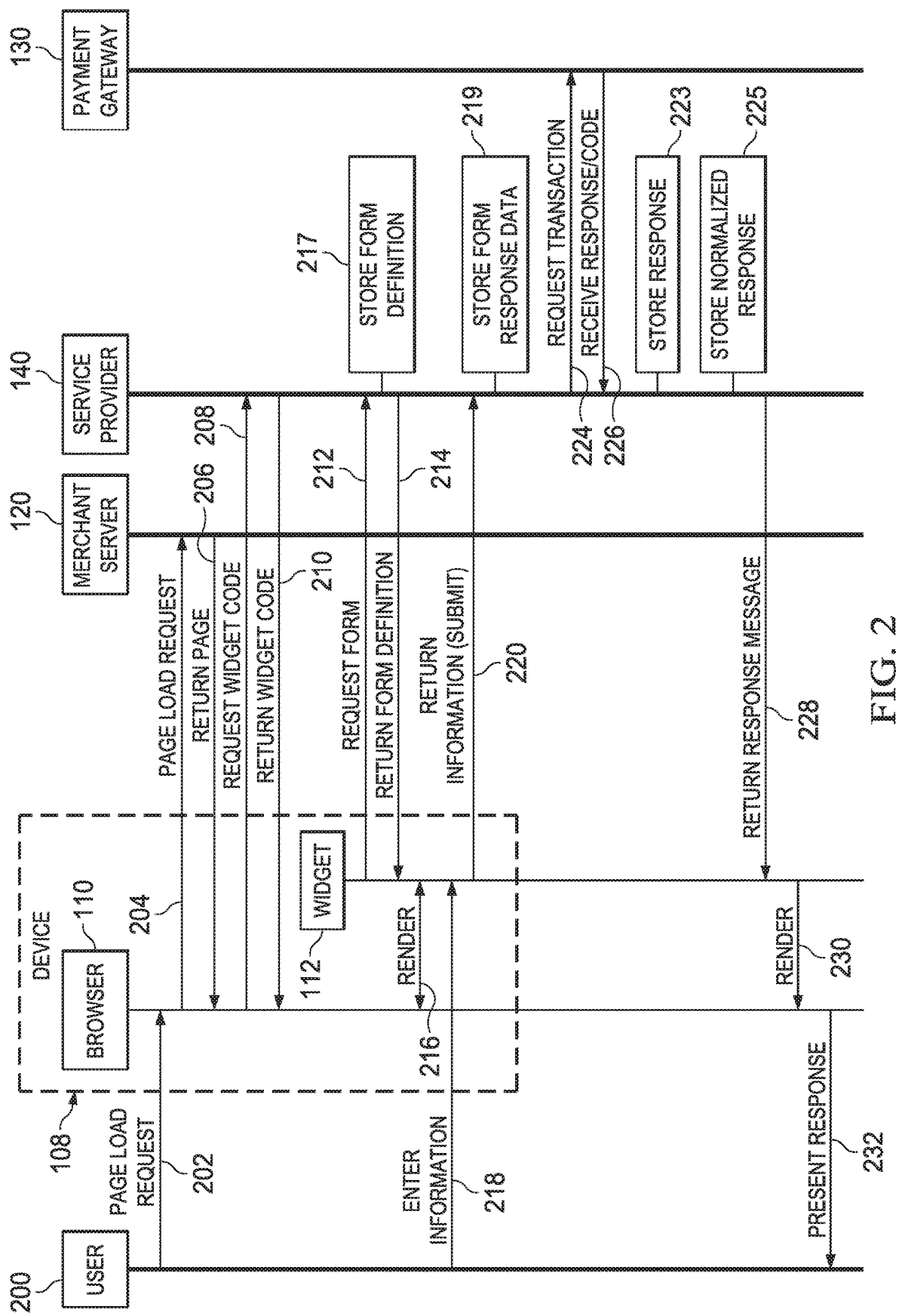
FIG. 2 is a sequence diagram showing operation of an embodiment of the systems and methods disclosed.

Moving now to FIG. 2, a sequence diagram illustrating one embodiment of a sequence of communication within an architecture having components similar to those of FIG. 1 is depicted. Chronological time is illustrated proceeding from the top to the bottom of FIG. 2. The user 200 may access a web page of a merchant organization 120, including a web page with payment functionality, through an input to his browser 110 (reference numeral 202). This input may be a click of a link on a web page currently being presented in the browser 110, clicking on a link presented in another context (e.g., in an e-mail), typing a Uniform Resource Location (URL) into the browser's address bar, or by some other method. Based on this access, the browser 110 may send a request to the server of the merchant organization 120 for the accessed web page (reference numeral 204), which is returned to the browser 110 (reference numeral 206). The embed code within the web page may then cause the browser to issue a request (reference numeral 208) for the widget to service provider 140 (e.g., if the widget 112 is not already present or executing on the user device 108), which returns the widget 112 to the browser (reference numeral 210) where it is executed by the browser 110. Additionally, based on the form identifier contained in the embed code of the web page, a request (reference numeral 212) for a form definition (e.g., corresponding to the form identifier or the user 200) may be issued through the browser 110 to the service provider 140.

The service provider 140 may create a form definition, store this form definition (reference numeral 217) and return (reference numeral 214) the form definition to the widget 112 through the browser 110 (reference numeral 216). Widget 112 then renders the returned form definition (reference numeral 216) such that it can be presented to the user through the browser 110 in conjunction with the rendering and presentation of the web page through the browser 110. Thus the context experienced by user 200, which is determined by the web page presented to the user within the browser 110, may remain unchanged when widget 112 renders the form in association with the web page.

The user 200 can then enter the payment information requested by the form using the fields provided by the form in the web page (reference numeral 218). If payment information is entered into a payment form, the payment information generally includes a payment amount and at least one payment identifier, such as a credit card number or a bank routing number and bank account number, and may include additional information such as a user name or identifier, user physical or electronic mail address, etc. The indicated payment may be made in exchange for a good or service or may be a donation.

This payment or other information is received by the widget 112 and returned (reference numeral 220) to the service provider 140. The returned form response data is stored (reference numeral 219) at the service provider 140. Additionally, the service provider 140 may utilize this form data to submit a request (reference numeral 224) for the payment transaction to a payment gateway 130. The payment gateway 130 will process the transaction using the payment information and return one or more responses including a transaction code or other data to the service provider server 140 (reference numeral 226).

The service provider 140 receives this gateway response and stores the original payment gateway response (reference numeral 223) in association with an identifier for the user 200, the merchant organization 120, the form definition 217 sent to the user 200 and the from data 219 including the payment information provided by the user 200. Additionally, the service provider 140 may normalize the original gateway response, or portions thereof, to determine a normalized service provider code or other normalized data and store such normalized response date (reference numeral 226) in association with the identifier for the user 200, the merchant organization 120, the form definition 217 sent to the user 200, the form response data 219 including the payment information provided by the user 200 and the original payment gateway response 223.

Thus, data for each payment transaction within the service provider 140 may be associated with one or more of a user, metadata associated with that transaction, the actual code received from the payment gateway, a normalized code determined from the received code by the service provider 140 or almost any other desired information the service provider 140 wishes to store in association with the payment transaction that may be used as described below or used for other purposes or reported to other entities such as merchants, payment gateway providers, banking networks, card issuers, etc.

The service provider 140 may then communicate one or more response messages (reference numeral 228), such as an indication of success or denial, an error, a request for additional information or almost any type of response desired, to the widget 112 based on the response received from the payment gateway 130. The response message may be rendered (reference numeral 230) by the widget 112 to present the response to the user 200 through the browser 110 (reference numeral 232). The presentation within the web page is accordingly updated to provide the form including the message to user 200 while again preserving the user's context within web page.

Figure 3:
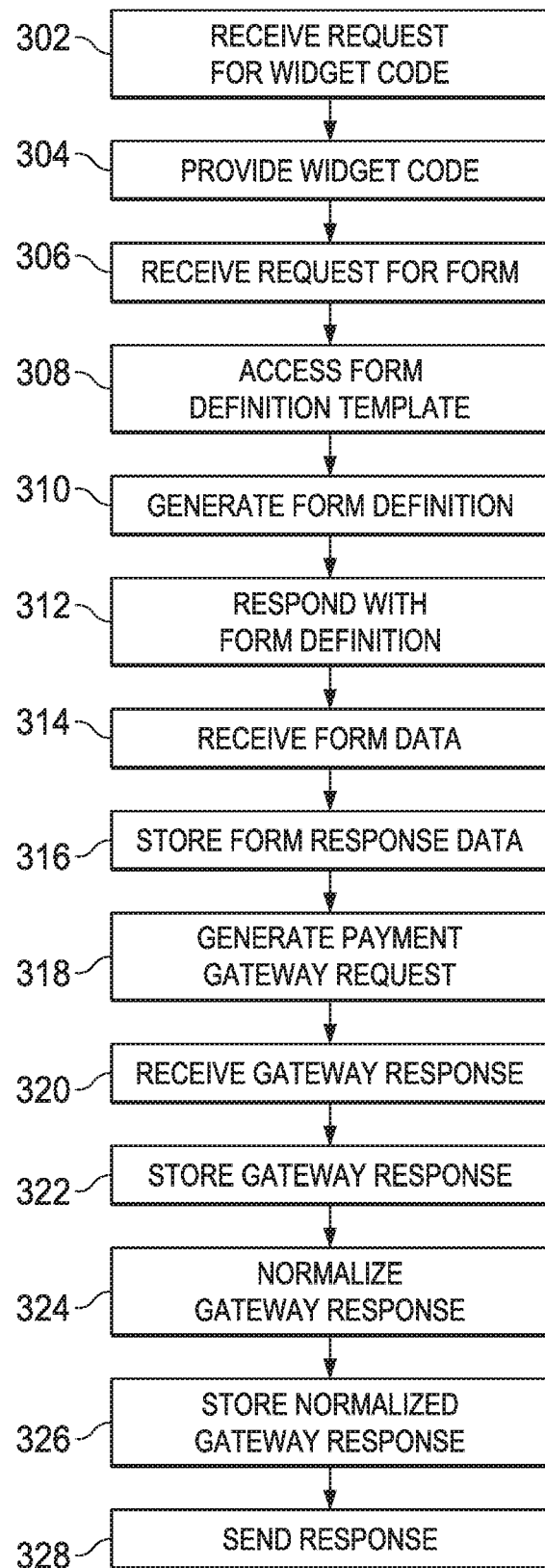
FIG. 3 is a flow diagram depicting one embodiment of a method for implementing a service provider.

FIG. 3 depicts one embodiment of a method that may be implemented at a service provider to conduct payment transactions. At step 302 the service provider may receive a request for a widget. Such a request may be received from a browser at a user device and result from the rendering, by the browser, of a web page affiliated with a merchant organization that utilizes the service provider to conduct payment transactions. Such an organization may be, for example, a nonprofit attempting to raise money through donations.

In particular, one or more web pages provided by the merchant organization, including those through which payment information is to be obtained, may include an embed code. This embed code can cause the web browser of a user browsing the merchant organization's web page to request the widget from the service provider (e.g., if the widget is not already present or executing on the user device) such that the service provider may receive the request for the widget. The widget may include code such as JavaScript or the like, which may be executed by the browser at the user's device. The widget may thus be returned in response to the request at step 304.

The service provider may then receive a request for a form at step 306. In particular, the embed code included in the web page being rendered by a user's browser may also contain a form identifier. The widget executing in association with the browser sends a request for the form identifier contained in the embed code to the service provider. The widget may also create a unique user identifier associated with user device, or a user on the user device, and provide that user identifier with the form identifier in the request to the service provider.

When the service provider system receives the form request at step 306, it may identify and access a form definition template associated with the form identifier at step 308. This form definition template can then be utilized to generate a form definition at step 310. Specifically, in one embodiment, service provider may receive a request for a form from the widget where the request includes a form identifier or a user identifier. The service provider may store user data including the user identifier and other data associated with the form request (e.g., data that may be determined about the request such as IP address, browser type, language, encoding, etc.). The form definition template associated with the form identifier contained in the form request received from the widget may be identified and accessed to generate a form definition.

This generation may include the determination of the questions (e.g., fields) to include in the form, which of those questions to prefill with data if it is available (and what data to utilize), globalization or internationalization data, or other data to create the form definition. The form definition generated can thus include JavaScript Object Notation (JSON) data that may be used to define a form. Additionally, the form definition may include one or more CSS style sheets that may be used in the rendering of the form definition. Additionally, data for the created form definition may be stored in association with the user data and the form definition template. This form definition data may include data on the questions, prefill, style, etc. of the form definition generated for that user. Once the form definition is generated, it is returned to the requesting widget at the browser on the user's device at step 312.

The widget at the user's device receives the form definition and processes the form definition to render the form to present to the user in the browser in association with the rendered web page. The presented form may, for example, be a payment form that includes a set of questions (e.g., fields) into which the user may enter payment information such as card information, a CCV number, a name, address, zip code, amount, etc. The form data, including the payment information entered by the user, may be returned to the service provider. In particular, the form data, including the payment information entered by the user into the form presented through the browser may be received by the widget and returned to the service provider.

The service provider may thus receive the form data at step 314 and store the form response data at step 316. In particular, once the form response data, including the payment information entered by the user, is returned to the service provider the user-provided data in the form response may be stored in association with the user identifier and form definition originally sent to the user. Additionally, data, such as metadata, cookie data, or other data communicated during a network communication session, such as an IP address, browser identity, campaign identifier, organization identifier, e-mail address, user identifier, etc., that are additionally communicated to the service provider with the form response may also be stored.

A payment gateway request associated with the form response received from the user may be generated at step 318. In particular, in one embodiment a payment gateway associated with the campaign or merchant associated with the received form response may be determined. Based on the determined payment gateway, and the interface utilized by that payment gateway, a request to perform a payment transaction associated with the received form response may be generated and sent. This payment gateway request may include the data required by the payment gateway to process the requested payment transaction, including for example, the credit card number, bank account or routing number, CCV number, address, amount, zip code, etc.

Accordingly, the service provider may receive a gateway response from the payment gateway as result of the submitted request for a payment transaction at step 320. Data from the received payment gateway response, including a proprietary transaction code or other data received from the payment gateway, can be stored at step 322. This stored original payment gateway response data is associated with the user identifier of the user who initially requested the payment transaction through the form, the form definition sent to that user, and the user's response to the presented form.

Additionally, the service provider may normalize the received original payment gateway response to one or more codes specific to the service provider at step 324 and store this normalized gateway response. These normalized codes will thus allow responses from a number of different payment gateways, that each may use different proprietary transaction codes, to be standardized into a set of normalized transaction codes used by the service provider system. Transaction processing engine may thus identify the payment gateway from which the original payment gateway response was received and access a mapping of possible transaction codes for that payment gateway and normalized transaction codes used by the service provider system to determine a normalized transaction code to store for the normalized gateway response at step 326. The stored normalized payment gateway response data is thus associated with the original payment gateway response data, the user identifier of the user who initially requested the payment transaction through the form, the form definition sent to that user, and the user's response to the presented form.

The service provider may then send one or more response messages to the user at step 328 based on the response received from the payment gateway. In particular, the service provider may create a form definition for the response message using a form definition template and return this response form definition to the widget where it is rendered by the widget and presented to the user at the user device. The newly rendered form with the response message may, for example, replace the form previously presented to the user, may be rendered in a pop-up window, etc. This response message may include an indication of success, a decline, a prompt for additional or different information, a thank you or some other response message entirely.

It will be helpful to an understanding of embodiments as presented herein to briefly discuss an example of normalized transaction codes that may be utilized by embodiments as presented herein. In Appendix A examples of some of these normalized transaction codes are presented. Specifically, the "Normalized Code" column of the table in Appendix A includes examples of the normalized transaction codes that may be determined for one or more corresponding proprietary transaction codes returned from a payment gateway. The "Description" column indicates a meaning for each of the normalized transaction code, and the "Display" column includes a message or description of a type of message that may be returned to be displayed to a user in the case a payment transaction initiated by the user through a form results in a transaction code from a payment gateway that is normalized to the normalized transaction code in the "Normalized Code" column.

It may also be useful to discuss embodiments of the storage of form definition templates, form definition data, campaign data, form data, payment gateway data, etc. that may be utilized by a service provider. FIGS. 4A-4D depict one embodiment of a schema for a database that may be utilized in conjunction with embodiment of an service provider as discussed above.

Figure 4A:
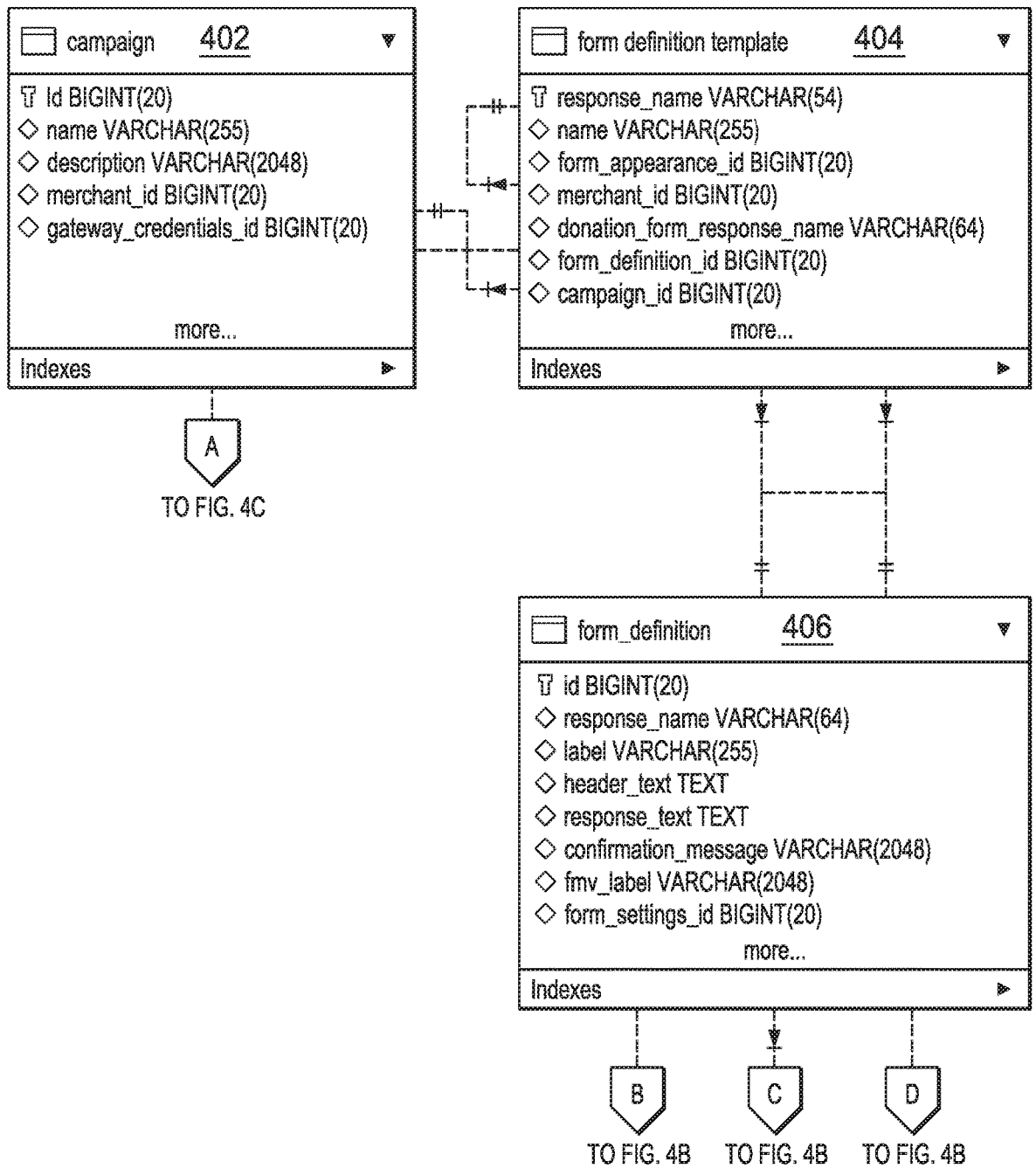
Figure 4B:
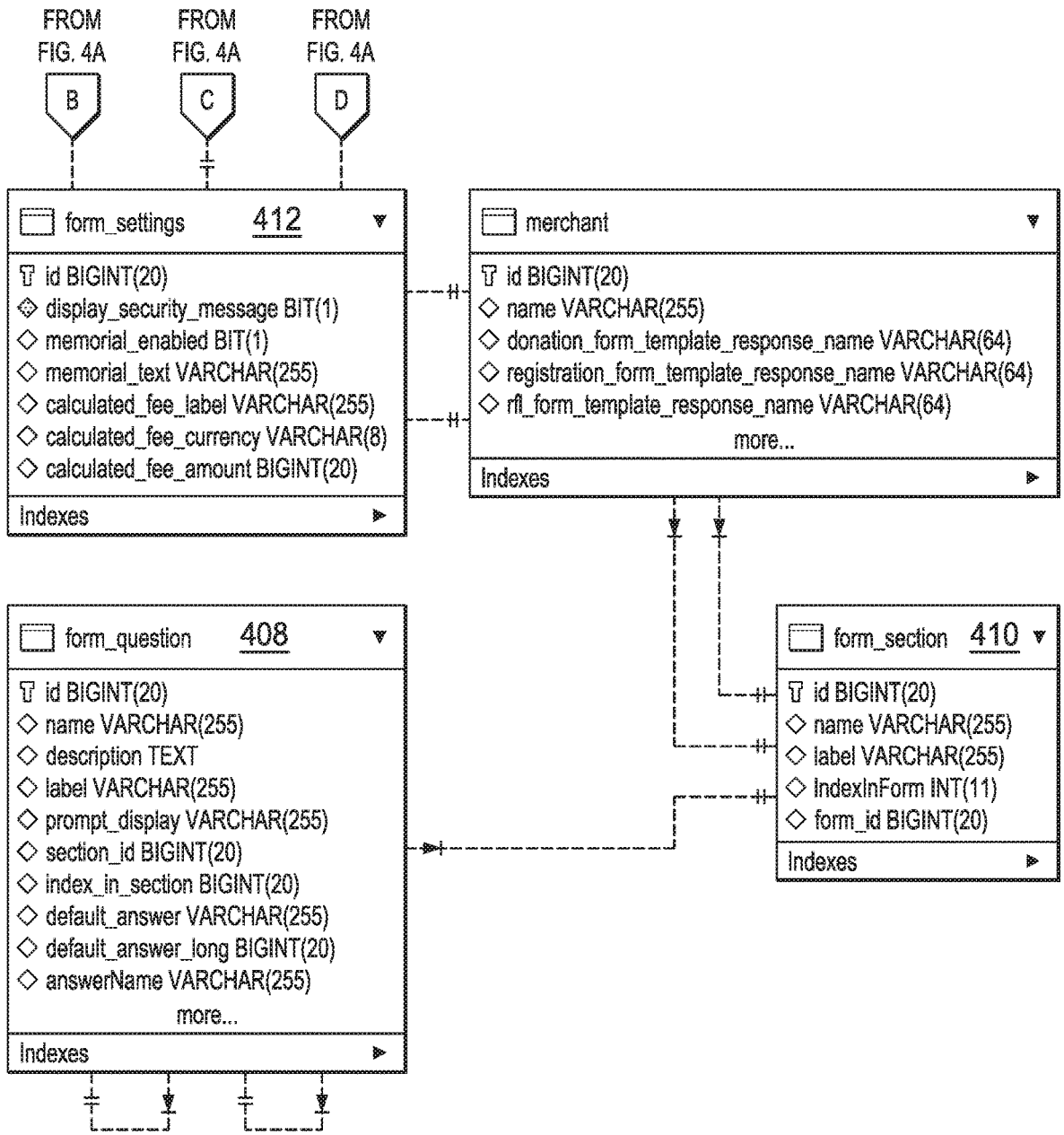
Figure 4C:
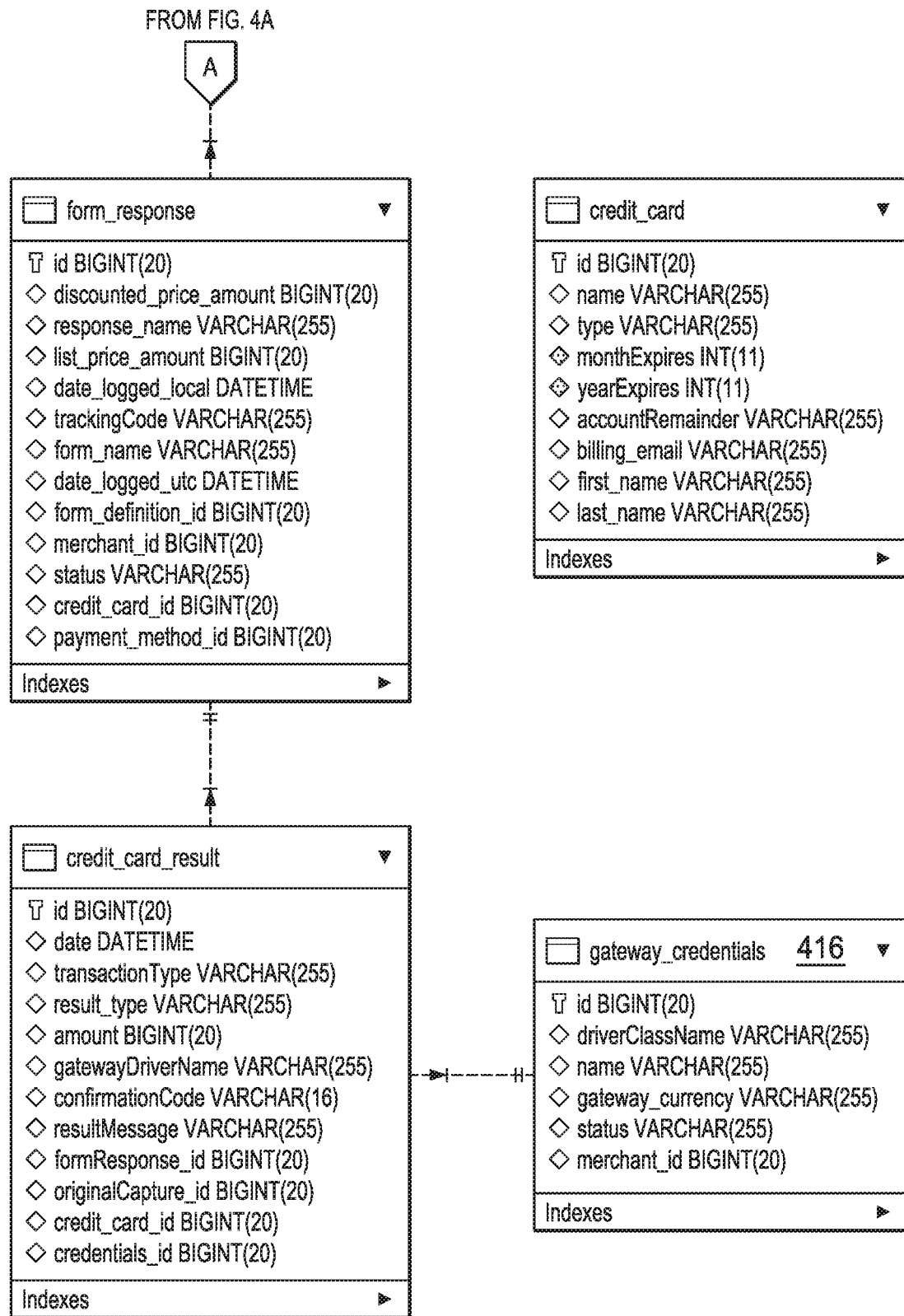

Turning first to FIG. 4A, one embodiment of a schema for the storage of data relating to campaigns and directories is depicted. In this schema, a schema for a campaign 402, a form definition template 404 and a form definition 406, among others, is depicted. In FIG. 4B, one embodiment a schema for a form question 408, a form section 410, form settings 412, among others, are depicted. FIG. 4C depicts one embodiment of a schema for a form response 414 and gateway credentials 416 for an associated gateway among others, while FIG. 4D depicts one embodiment of a schema for a gateway request 418 and a gateway response 420.

Now that an embodiment of a service provider has been described, along with embodiments of how such a service provider may be utilized in association with a merchant's web site to provide the ability to conduct payment transactions through the merchant organization's web site, it will be helpful to recall the above discussion of the fraudulent use of web sites offering such payment functionality. In particular, web sites with payment functionality are often the target of scammers who typically use automated scripts in conjunction with the payment functionality offered on the web site (e.g., through a form or API) to initiate thousands of payment transactions for different permutations of payment information (e.g., credit card numbers, CCV codes, address, zip code, cardholder name, etc.) and record which permutations of payment information result in a successful or completed payment transaction.

In the context of embodiments where a service provider implements payment functionality on the merchant organization's web page, each of these payment transactions is received by the service provider (e.g., in a form response or through an API offered by the service provider) who, in turn, submits the payment transaction to a payment gateway. In many cases, when a scammer is utilizing an automated script a large number of these payment transactions (e.g., on the order of hundreds, thousands, or tens of thousands) may be declined by the payment gateway(s) to which they are submitted.

This is highly problematic for a variety of reasons. First, and importantly, the merchant may be charged a fee by the payment gateway for each denied transaction. The fees associated with such denials, especially in the case where thousands or more of these payment transactions are submitted in a short time frame, can severely impact the finances of the merchant organization. Moreover, from a functional standpoint, the submission of the requests by an automated script, the reception and processing of the high volume of submissions, and the storage of data associated with the denied request can severely impact the performance (e.g., speed, memory usage, etc.) of computing devices involved in the payment transaction on the distributed computer network, causing slow response times, excessive memory usage and other problems that may impact the performance and functionality of the computer devices or networks involved in these payment transactions. Such performance problems in this network-centric environment may, in turn, cause potential customers or legitimate donors to experience friction in conducting such online payment transactions (e.g., donations to a merchant organization) and may even cause them to cancel, or not engage in, such payment transactions.

It is thus desired by participants in such payment transactions to substantially reduce the network-centric problems, monetary consequences or other undesirable effects resulting from submission of fraudulent payment transaction (e.g., to a payment gateway). Embodiments of service providers may therefore include functionality to pro-actively determine that an online payment transaction may be fraudulent before it is submitted to the payment gateway.

To those ends, among others, attention is now directed to embodiments of the systems and methods presented herein. In particular, service providers that provide forms for submission of payment transactions may leverage their location in the distributed computer environment to implement pro-active threat detection based on an aggregate view of payment transactions in that distributed computer network. In some embodiments, therefore, service providers may perform threat assessment and analysis of online payment transactions, and responses thereto, based on analysis of aggregated data obtained from across the distributed computer network in accordance with other online payment transactions.

Specifically, embodiments of such systems and methods may operate in conjunction with a service provider that provides forms (including payment forms) to a number of different merchants affiliated with a number of different payment gateways and submits payment information to those different payment gateways in association with those payment transactions. The data associated with the completed payment transactions can be stored at the service provider. This aggregated data can be analyzed using a number of fraud prevention (FP) rules, where each rule evaluates the aggregated data based on an associated pattern to determine zero or more identifiers associated with that FP rule.

The list of identifiers generated by each of the FP rules can then be used by the system in the analysis of incoming payment transaction requests. More specifically, embodiments may determine data associated with an incoming payment transaction request for a FP rule (e.g., an IP address, a financial identity, etc.) and compare the determined data for the rule with the lists of identifiers generated by application of those FP rules to the aggregated data. If the data determined from the received payment transaction request (e.g., identifier) matches an identifier on the lists of identifiers corresponding to the FP rules, a threat may be detected. In such cases, the payment transaction may not be sent to the payment gateway.

Additionally, certain embodiments may determine a response (e.g., a form) to send to the user from which the payment transaction request was received. Such a response may be an indication of transaction success, a denial of the transaction without a cause, a denial with a cause of incorrect information provided, an undetermined response, (e.g., not related to the validity of the payment information such as a system error), or some other response. In this manner, scammers utilizing a merchant's web site for the validation of payment information may be kept unaware both that their payment transaction request was never actually evaluated and the true nature of the payment information, thinking that the payment information was valid or invalid, regardless of the true nature of the validity of the payment information. Choosing certain responses may raise the effort threshold required by these scammers to utilize a merchant's web site for payment information validation and cause them to cease those activities, or at least to cease utilizing the merchant's web site for such activities. This procedure of "scamming the scammers" will thus have the effect of deterring future uses of the merchant organization's web site for credit card or other types of fraud.

Figure 5:
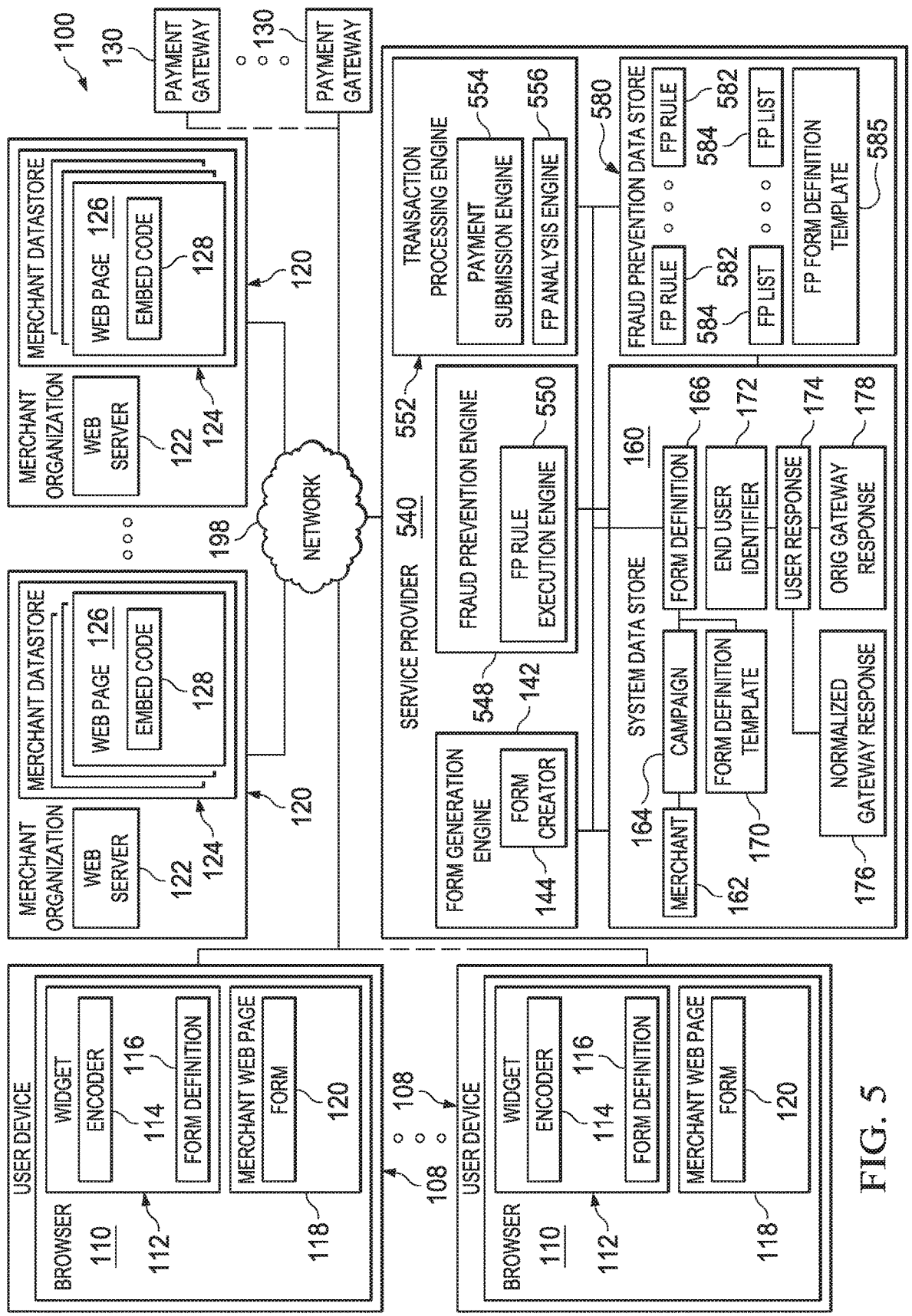
FIG. 5 is a diagrammatic representation of an architecture including an embodiment of a service provider system.

FIG. 5 depicts a diagram of an architecture of a distributed network computer system for conducting online payment transactions that includes an embodiment of a service provider system that performs pro-active threat assessment and analysis of online payment transactions. Certain components of the architecture given the same reference numerals as corresponding components in FIG. 1 may function substantially similarly to the description given above and will not be elaborated on in more detail except to explain any different or additional functionality that may be included with such components.

As described above, service provider 540 is coupled to user devices 108, merchant organizations 120 and payment gateways 130 over network 198. One or more web pages 126 provided by the merchant organization 120, including those through which payment information is to be obtained, may include an embed code 128. This embed code 128 can cause the web browser 110 rendering the merchant organization's web page 126 to request a widget 112 from service provider 540. The embed code 128 may also contain a form identifier corresponding to a form definition template 170. The widget 112 sends a request for the form identifier contained in the embed code 128 to the service provider 540.

Service provider 540 may therefore receive requests for forms from widget 112 where the requests include a form identifier or a user identifier. The service provider may store user data 172 including the user identifier and other data associated with the request (e.g., data that may be determined about the request such as IP address, browser type, language, encoding, etc.) in the data store 160. Service provider 540 may also provide the form request to form generation engine 142. Form generation engine 142 may determine the form definition template 170 associated with the form identifier contained in the request. The form creator 144 may process the form definition template 170 to generate a form definition 116. Once the form definition 116 is created by the form creator 144, it is returned to the requesting widget 112 at the user device 108 in response to the form request. Additionally, the form generation engine 142 stores data 166 for the created form definition 116 in the data store 160 at the service provider 540. The widget 112 processes the form definition 116 to render form 132 in the rendered web page 118 presented in the browser 110

In cases where the user is intended to enter payment information utilizing the rendered web page 118 the form 132 may be a payment form that includes a set of questions (or fields) into which the user may enter payment information such as card information, a card verification value (CCV) number, a name, address, zip code, amount, etc. The form data, including the payment information entered by the user, may be returned to the service provider 540. Once the form response data, including the payment information entered by the user, is returned to the service provider 540, this user response 174 (also known as a form response) including the form data may be stored in the data store 160 in association with the user identifier 172 and data 166 for the form definition originally sent to the user. Additionally, data, such as metadata, cookie data, or other data communicated during a network communication session, such as an IP address, browser identity, campaign identifier, organization identifier, e-mail address, user identifier, etc., that are additionally communicated to the service provider 540 with the response from the widget 112 are stored in the user response 174.

The received payment information and any other desired form data may be provided to transaction processing engine 552. The transaction processing engine 552 may determine a payment gateway 130 associated with the campaign or merchant associated with the received form response using the data in data store 160 and submit the payment transaction to the payment gateway 130 using payment submission engine 554. If the payment transaction is submitted to the payment gateway 130, the transaction processing engine 552 may receive a response from the payment gateway 130 (known also as a gateway response) in response to a submitted request for a payment transaction. Data 178 from the received payment gateway response, including the proprietary transaction code or other data received from the payment gateway 130, can be stored in the data store 160 by the transaction processing engine 552. The original payment gateway response data 178 stored is associated with the user identifier 172 of the user who initially requested the payment transaction through the form 132, the form definition sent to that user (e.g., form definition data 166 associated with the user identifier 172 and form definition template 170), and the form response to the presented form (e.g., user response 174).

Additionally, transaction processing engine 552 may normalize the original payment gateway response to one or more codes specific to the service provider 540. This normalized gateway response data 176 including the normalized transaction code is stored in the data store 160 by transaction processing engine 552. The normalized payment gateway response data 176 is thus associated with the original payment gateway response data 178, the user identifier 172 of the user who initially requested the payment transaction through the form 132, the data 166 for the form definition sent to that user and the user's response to the presented form (e.g., user response 174).

Accordingly, the system data store 160 may contain a wealth of aggregated data regarding payment transactions that have occurred in the distributed network computing environment, including data on payment transactions that were approved or declined, the IP addresses from which those payment transactions were initiated, data on the users (e.g., name, credit card information, addresses, country of origin, etc.) who initiated the payment transactions, the velocity (e.g., frequency) of transaction requested from a location (e.g., IP address, country, etc.), and a wide variety of other data. The aggregated data in system data store 160, or portions thereof, is collected during, and as a direct result of, the payment transactions being conducted on the distributed computer network and was produced as a direct result of conducting those transactions on such a distributed computer network. The aggregated data in the system data store 160 can thus be utilized in the service provider system 540 to provide threat assessment and analysis of payment transactions occurring in that distributed computer network.

In particular, service provider 540 may include embodiments of a fraud prevention engine 548 and fraud prevention data store 580. Embodiments of fraud prevention engine 548 may operate substantially asynchronously from other components (e.g., form generation engine 142, transaction processing engine 552, etc.) of the service provider 540. In other words, fraud prevention engine 548 or components thereof may execute at a time interval or triggered by another means such as a programmatic request or environmental change (e.g., every 5 minutes, every half hour, every hour, every night, every week, command line program, HTTPS request, etc.) that is not dependent on the timing or operation of these other components.

Fraud prevention data store 580 may include one or more FP rules 582. As will be explained in more detail later, each FP rule 582 may include instructions to evaluate data in system data store 160 to determine sets of data that matched a pattern and for each set of data that matched the pattern, produce and store an identifier corresponding to the matching set of data. Thus, each FP rule 582 may produce a corresponding FP list 584 that contains one or more identifiers for sets of data that matched the pattern of that FP rule 582. These FP rules 582 may, for example, be a SQL procedure that obtains one or more tables in the system data store 160 and based on data in the table(s) that matches the pattern, determines identifiers (e.g., IP addresses, names, credit card numbers (last four digits, institution/bank issuing number, etc.), some combination thereof, etc.) based on the data in the tables.

For example, in some embodiments, an FP rule 582 might have a pattern for identifying more than ten declines associated with the same IP address in one hour. For each set of data identified by the FP rule 582, the IP address may be placed in an FP list 584 corresponding to the FP rule 582. In some embodiments, pattern of the FP rule 582 may have a pattern for identifying that the ten declines identified are from a single campaign, across several campaigns, across several merchant organizations or gateways, etc.

As another example, in some embodiments, an FP rule 582 might have a pattern for identifying if multiple payment transaction requests have used different zip codes for the same address. For each set of data identified by the FP rule 582, the IP address may be placed in an FP list 584 corresponding to the FP rule 582. Other patterns for FP rules 582 may be employed. As an additional example, a pattern may verify that the zip/postal code for a payment transaction request matches the city referenced in a submission, while other patterns may specify that a call or request should be made to a registered card network service or an issuing bank service to determine data about a payment transaction associated with data in data store 160. Thus, embodiments advantageously examine both data originating from the user (e.g., from user devices 108) and data originating from the payment gateways 130, banks or other third parties on the distributed computer network, in performing fraud prevention. While other examples of such FP rules 582 will be given in more detail at a later point, many other embodiments of FP rules 582 are possible and all such rules are fully contemplated herein.

Fraud prevention engine 548 contains FP rule execution engine 550 that executes each of FP rules 582 at a time interval, on-demand, or per some event trigger (e.g., every 10 minutes, hourly, daily, HTTP(S) request, change in environment, boot time of the machine, etc.). Each FP rule 582 may be executed by the FP rule execution engine 550 at the same time interval, each FP rule 582 may be executed according to a different time interval, or some combination. Accordingly, during execution, FP rule execution engine 550 may obtain the FP rule 582 and that FP rule 582 may execute by obtaining sets of data from system data store 160, determining if any of those sets of data match the pattern of that rule and producing the identifiers of the sets of data that match the pattern of the rule as corresponding FP list 584. In one embodiment, for one or more FP rules 582, each identifier in the corresponding FP list 584 may be associated with an expiration time stamp denoting a time period after which that identifier in the FP list 584 may no longer be utilized or should no longer be considered a restriction on the payment request.

These FP lists 584 containing identifiers associated with potentially fraudulent transactions may be utilized during the processing of incoming payment transactions to perform pro-active fraud prevention by, for example, stopping potentially fraudulent payment transactions from ever reaching the payment gateway 130 itself. In one embodiment, when transaction processing engine 552 receives payment information and any other desired form data for a requested payment transaction, the transaction processing engine 552 may perform such a fraud prevention analysis before such a payment transaction is submitted to payment gateway 130. In particular, the payment information and other form data for the incoming payment transaction may be provided to FP analysis engine 556.

FP analysis engine 556 may determine an identifier corresponding to the incoming payment transaction for each of the FP rules 582 based on the payment information or other form data for the incoming payment transaction. The identifier created for the incoming payment transaction corresponding to a particular FP rule 582 may be of the same format (e.g., contain the same data or type of data) as each identifier in the FP list 584 corresponding to the FP rule 582. The data, or type, of an identifier for each FP rule 582 may be determined by FP analysis engine 556 utilizing that FP rule 582, the corresponding FP list 584, by configuration data previously established (e.g., by an administrator of service provider system 540) or by some other method. For example, if the FP list 584 for that FP rule 582 includes a set of IP addresses, the FP analysis engine 556 may determine the IP address of the incoming payment transaction; if the FP list 584 for that FP rule 582 includes the last 4 digits of the credit card, plus the expiration date of the card, the FP analysis engine 556 may create an identifier for the incoming payment transaction comprising the last 4-digits of the credit card of the incoming transaction combined with the expiration date of the card for the incoming transaction.

For each FP rule 582, FP analysis engine 556 may compare the current identifier associated with the incoming payment transaction against the list of identifiers contained in the corresponding FP list 584 to determine if the current identifier matches any of the identifiers of the FP list 384. If the current identifier matches one of the list of identifiers in the FP list 584 the incoming payment transaction may be identified by transaction processing engine 552 as a fraudulent transaction. This identification may include placing a flag or other data in system data store 160 in association with the data 174 for the form response that requested the payment transaction that indicates the requested payment transaction associated with that form response has been identified as potentially fraudulent. In the cases where an identifier of the FP list 584 is associated with an expiration time stamp, the time of the incoming payment transaction (e.g., at which it was received) may be compared with the expiration time stamp, and if the time of the incoming payment transaction is after the expiration time stamp the incoming transaction may not be flagged as a fraudulent transaction.

If the incoming transaction has not been flagged as fraudulent (e.g., the identifier(s) created for the incoming payment transaction corresponding to each FP rule 582 do not match any identifier in the corresponding FP list 584), the transaction processing engine 552 may then determine a payment gateway 130 associated with the incoming payment transaction and submit the payment transaction to the payment gateway 130 using payment submission engine 554 as previously discussed. Additionally, in some embodiments, even if the incoming payment transaction has been flagged as fraudulent by FP analysis engine 556, there may be one or more "whitelisted" identifiers (e.g., merchant identifiers, campaign identifiers, IP addresses, etc.) for which incoming payment transactions should be submitted to the payment gateway 130, even in cases where the incoming payment transaction has been flagged by FP analysis engine 556 as fraudulent. The transaction processing engine 552 may obtain the corresponding identifier associated with the incoming payment transaction (e.g., the merchant identifier, campaign identifier, IP address, etc. associated with the incoming transaction) and if the identifier for the incoming payment transaction matches an identifier on the whitelist, the incoming payment transaction may be submitted to the payment gateway 130 regardless of whether the incoming payment transaction was previously flagged as fraudulent.

If, however, the incoming payment transaction has been identified (e.g., flagged) as fraudulent by the transaction processing engine 552, a response may be sent back to the user at the user device 108, without ever submitting the requested payment transaction to a payment gateway 130. The response that is sent in such cases may be almost any response desired. In certain embodiments, such a response may be chosen to alert, or avoid alerting, a user at the user devices that may be a fraudulent user such as a scammer or the like, that his behavior has been detected. As noted herein, the response sent to the user may be congruent with the determination of the fraud prevention analysis engine 556, (e.g., a denial, or a reason for denial, when the incoming payment request has been identified as fraudulent) or the response may be incongruent (e.g., an indication of success when the incoming payment request has been identified as fraudulent). For example, while some embodiments may send back a simple "Fail" or "Decline" message, other embodiments may attempt to "scam the scammer" by sending back illegitimate confirmation messages. That is, in some embodiments, a user whose requested payment transaction has been identified as fraudulent may receive a positive message indicating that the transaction went through.

In particular, in certain embodiments, the service provider 540 may communicate one or more response messages to the user via the widget 112 intended for potentially fraudulent users. In particular, the service provider 540 may create a FP form definition for the response message using a FP form definition template 585 (or another form definition template 170 that may be associated with the merchant 162 or the campaign 164) and return this response form definition to the widget 112, where it is rendered by the widget and presented to the user at the user device 108.

The newly rendered form may, for example, replace form 132 previously presented to the user, may be rendered in a pop-up window, etc. This response message may again include an indication of success (despite that the payment transaction was never submitted to the payment gateway 130), a decline (again, despite that the payment transaction was never submitted to the payment gateway 130), an error message (e.g., an indication that a system or communication error has occurred) or some other response. In other embodiments, the FP form definition created may include a random message may be selected or simple card invalid message. Other messages are possible and are contemplated herein.

By utilizing response messages that are not necessarily congruent with the determinations made at the service provider 540 and that may, or may not, be consistent in similar instances, the fraudulent user submitting such payment requests will not receive a reliable and consistent answer from the service provider system 540. As such, the fraudulent user may have an incorrect view of the validity of the payment information (e.g., believing payment information is valid when it is not or vice versa) and may not be able to make a determination about what processing does, or does not, occur once such payment information is submitted. By imposing these additional obstacles to fraudulent users, these fraudulent users may be dissuaded or deterred from fraudulently utilizing web sites of merchant organizations 120 that utilize the service provider 540.

Figure 6A:
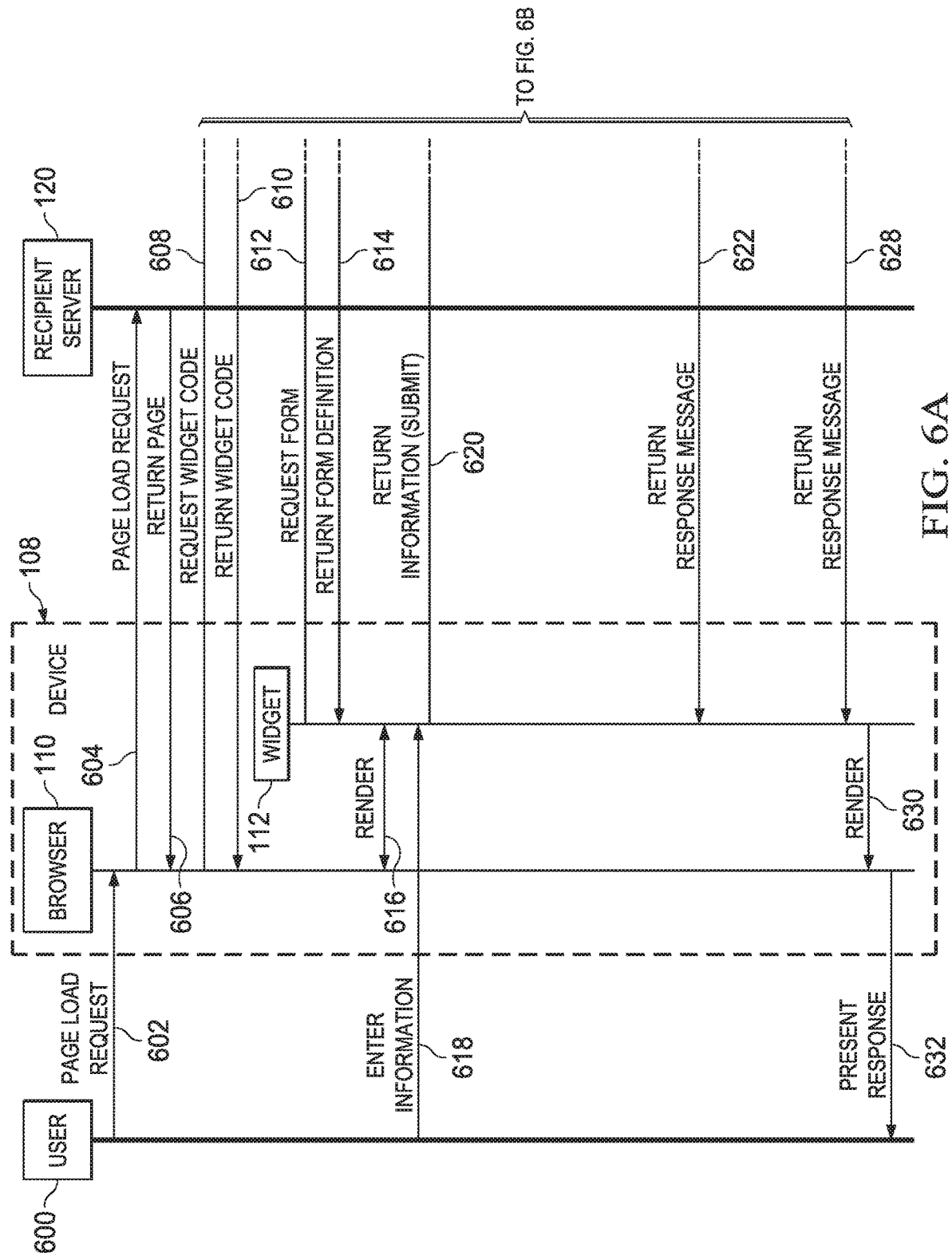
FIGS. 6A and 6B are a sequence diagram showing operation of an embodiment of the systems and methods disclosed.
Figure 6B:
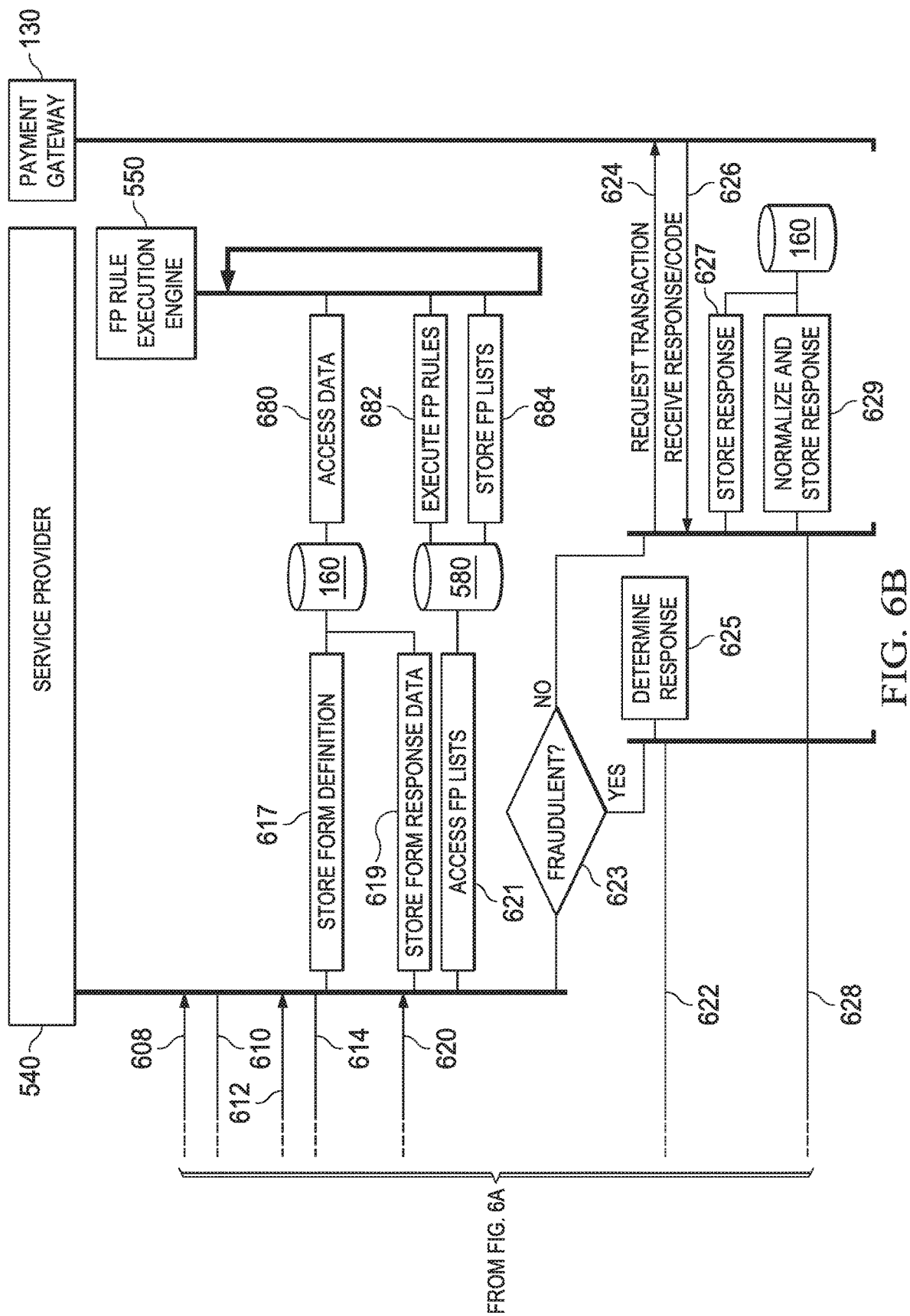

Looking now at FIGS. 6A and 6B a sequence diagram illustrating one embodiment of a sequence of communication within an architecture having components similar to those of FIG. 5 is depicted. Chronological time is illustrated proceeding from the top to the bottom of FIGS. 6A and 6B. The user 600 may access a web page of a merchant organization 120, including a web page with payment functionality, through an input to his browser 110 (reference numeral 602). Based on this access, the browser 110 may send a request to the server of the merchant organization 120 for the accessed web page (reference numeral 604), which is returned to the browser 110 (reference numeral 606). The embed code within the web page may then cause the browser to issue a request (reference numeral 608) for the widget to service provider 540 which returns the widget 112 to the browser where it is executed by the browser 110 (reference numeral 610). Additionally, based on the form identifier contained in the embed code of the web page, a request (reference numeral 612) for a form definition (e.g., corresponding to the form identifier or the user 600) may be issued through the browser 110 to the service provider 540.

The service provider 540 may create a form definition, store data for this form definition (reference numeral 617) in the system data store 160 and return (reference numeral 614) the form definition to the widget 112 through the browser 110 (reference numeral 616). Widget 112 then renders the returned form definition (reference numeral 616) such that it can be presented to the user through the browser 110 in conjunction with the rendering and presentation of the web page through the browser 110. The user 600 can then enter the payment information requested by the form using the fields provided by the form in the web page (reference numeral 618). If payment information is entered into a payment form, the payment information generally includes a payment amount and at least one payment identifier, such as a credit card number or a bank routing number and bank account number, and may include additional information such as a user name or identifier, user physical or electronic mail address, etc.

This payment or other information is received by the widget 112 and returned (reference numeral 620) to the service provider 540. The returned form data is stored (reference numeral 619) at the service provider 540 in the system data store 160. Rule execution engine 550 may be executing at a certain time interval. The FP rule execution engine 550 may access the FP rules in the FP data store 580 (reference numeral 682) and access the data in system data store (reference numeral 680) to apply these FP rules to the data stored therein. The FP lists generated by the application of these FP rules to the data in the system data store 160 may be stored in the FP data store (reference numeral 684).

Accordingly, when the form response requesting a payment transaction is received (reference numeral 620), the FP lists in the FP data store 580 can be accessed (reference numeral 621) and the identifiers contained in the FP lists can be compared with identifiers generated for the corresponding FP rules from the form data for the requested payment transaction to determine if the payment transaction should be identified as fraudulent (reference numeral 623).

If the payment transaction is identified as fraudulent the service provider 540 can determine a response message (reference numeral 625) and communicate the response messages (reference numeral 622), such as an indication of success or denial, an error, a request for additional information or almost any type of response desired, to the widget 112.

If the payment transaction is not identified as fraudulent (or, in one embodiment, determined to be on the whitelist), service provider 540 may utilize the form data of the payment transaction to submit a request (reference numeral 624) for the payment transaction to a payment gateway 130. The payment gateway 130 will process the transaction using the payment information and return one or more responses including a transaction code or other data to the service provider server 540 (reference numeral 626).

The service provider 540 receives this gateway response and stores the original payment gateway response (reference numeral 627) in association with an identifier for the user 600, the merchant organization 120, the form definition sent to the user 600 and the form data including the payment information provided by the user 600. Additionally, the service provider 540 may normalize the original gateway response, or portions thereof, to determine a normalized service provider code or other normalized data and store such normalized response data (reference numeral 629) in the data store 160 in association with the identifier for the user 600, the merchant organization 120, the form definition sent to the user 600, the form data including the payment information provided by the user 600 and the original payment gateway response. The service provider 540 may then communicate one or more response messages (reference numeral 628), such as an indication of success or denial, an error, a request for additional information or almost any type of response desired, to the widget 112 based on the response received from the payment gateway 130. The response message returned by the service provider 540 may be rendered (reference numeral 630) by the widget 112 to present the response to the user 600 through the browser 110 (reference numeral 632).

Figure 7A:
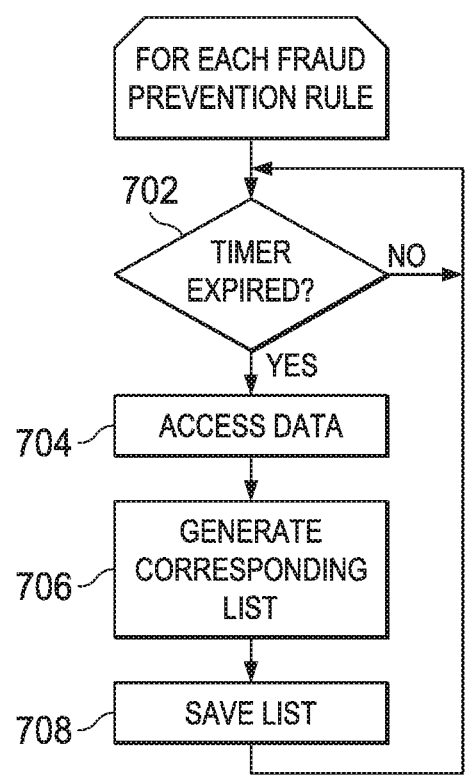
FIGS. 7A and 7B are flow diagrams depicting an embodiment of a method for implementing fraud prevention.
Figure 7B:
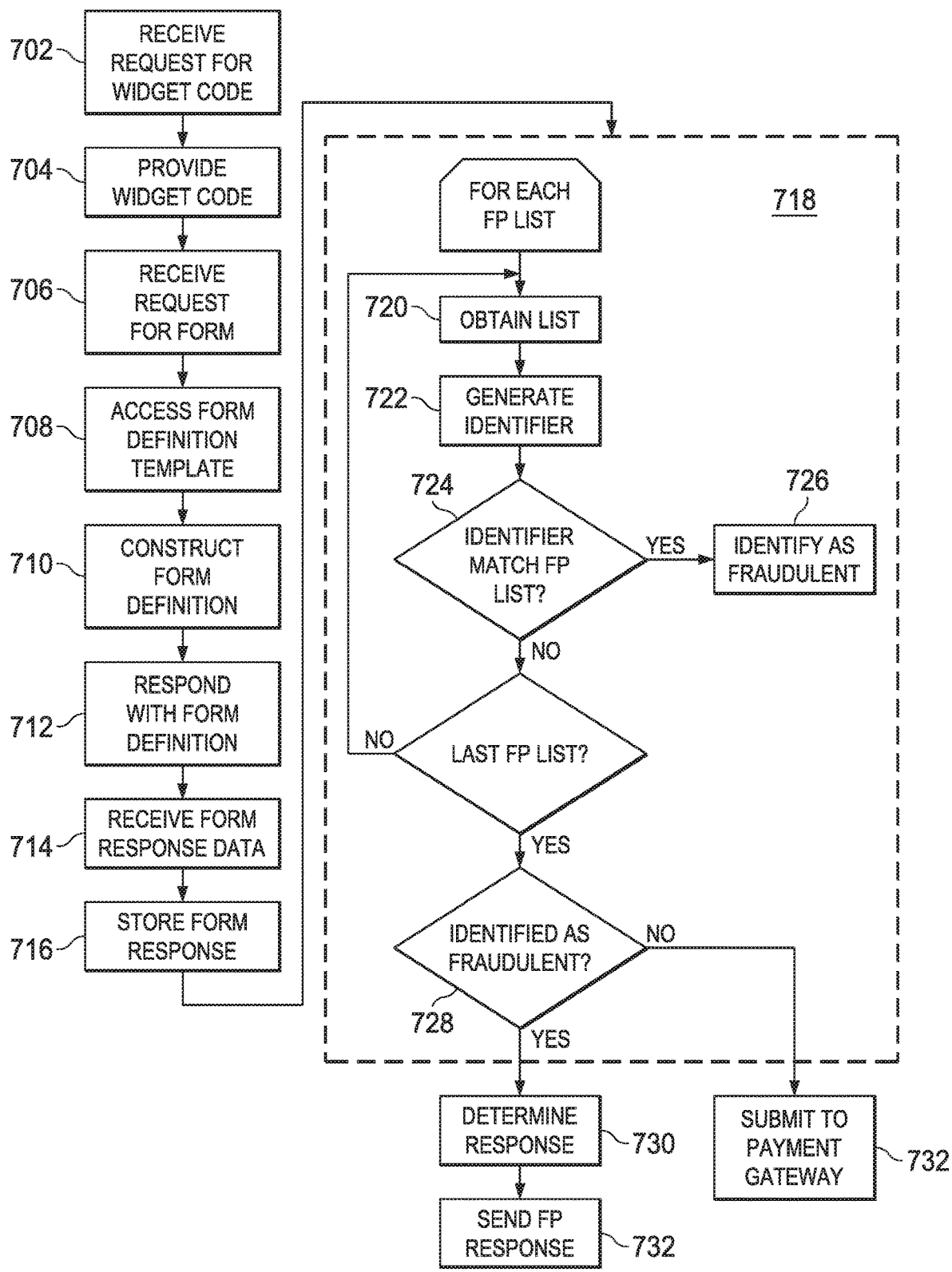

FIGS. 7A and 7B depict one embodiment of a method for fraud prevention that may be implemented at a service provider. Referring first to FIG. 7A, one embodiment of a method for the determination of identifiers for use in fraud prevention is depicted. Embodiments of this method may be utilized substantially asynchronously to other functionality of a service provider. In particular, for each of the fraud prevention rules that may be currently configured for a service provider system, at step 702 it can be determined if a time interval has passed. Such a time interval may be associated with only that particular FP rule, may be associated with all FP rules, may be associated with a group of FP rules, etc. If the time interval has not passed since the last time that FP rule was evaluated, that FP rule may not be evaluated. If however, the time interval (e.g., since the last time the FP rule was evaluated) has elapsed the FP rule may be evaluated. Each FP rule may include instructions to evaluate data stored by the service provider system to determine sets of data that matched a pattern and for each set of data that matched the pattern, produce and store an identifier corresponding to the matching set of data. These FP rules may, for example, be a SQL procedure that obtains one or more tables in the system data store and based on data in the table(s) that matches the pattern, determines identifiers (e.g., IP addresses, names, credit card numbers (last four digits, etc.), some combination, etc.) based on the data in the tables.

For example, one FP rule may have a pattern that identifies a set of data where the same credit card (e.g., identified by the last four digits of the credit card number and the same cardholder name) has been used to submit multiple payment transactions, where at least two payment transactions are for different amounts and have been declined by a payment gateway, and where that credit card number is associated with a successful result (e.g., transaction approved) from a payment gateway in the last hour.

As another example, a FP rule may include a pattern that identifies a set of data where the same IP address is associated with submitted payment transaction, where for all payment transactions associated with that IP address within the last day there were no successful submissions of an associated payment transaction to a payment gateway and there were more than ten failed submissions of payment transactions associated with that IP address to a payment gateway.

Accordingly, at step 704 the data stored at the service provider may be accessed and the FP rule evaluated against the set of data to determine sets of data that match the pattern FP rule. Based on the sets of data identified as matching the pattern of the FP rule, at step 706 a list of identifiers for each of the matching sets of data may be generated and stored at step 708. These identifiers may include a data from each of the sets of matching data identified at step 704. For example, an identifier may include an IP address, some combination of the card number (e.g., last four digits of the card), the expiration date, cardholder name (or portion thereof), zip code, or another identifier.

These FP lists containing identifiers associated with potentially fraudulent transactions identified by evaluation of the FP rules may be utilized during the processing of incoming payment transactions to perform pro-active fraud prevention by, for example, stopping potentially fraudulent payment transactions from ever reaching a payment gateway. FIG. 7B depicts one embodiment of a method for using the FP lists in such pro-active fraud prevention. As discussed, the embodiment of the method of FIG. 7B may be performed asynchronously to the embodiment of the method of the FIG. 7A. Thus, the FP rules (and corresponding FP lists) may be created or updated at almost any schedule desired to, for example, change the FP rules themselves, to make sure that the FP lists are created on a more or less frequent basis, or for a wide variety of other reasons, and that the FP lists so created or updated may be utilized substantially immediately in preventing fraud by integrating these lists in the processing of incoming payment transaction requests substantially as they are created or updated.

Initially, at step 702 the service provider may receive a request for the widget. The widget may thus be returned in response to the request at step 704. The service provider may then receive a request for a form at step 706. When the service provider system receives the form request at step 706 it may identify and access a form definition template associated with the form identifier at step 708. This form definition template can then be utilized to generate a form definition at step 710. Once the form definition is generated, it is returned to the requesting widget at the browser on the user's device at step 712.

The widget at the user's device receives the form definition and processes the form definition to render the form to present to the user in the browser in association with the rendered web page. The presented form may, for example, be a payment form that includes a set of questions (e.g., fields) into which the user may enter payment information such as card information, a CCV number, a name, address, zip code, amount, etc. The form response data, including the payment information entered by the user, may be returned to the service provider. In particular, the form response data, including the payment information entered by the user into the form presented through the browser may be received by the widget and returned to the service provider.

The service provider may thus receive the form data at step 714 and store the form data of the response at step 716. In particular, once the form data, including the payment information entered by the user is returned to the service provider the user-provided data in the form response may be stored in association with the user identifier and form definition originally sent to the user. Additionally, data, such as metadata, cookie data, or other data communicated during a network communication session, such as an IP address, browser identity, campaign identifier, organization identifier, e-mail address, user identifier, etc., that are additionally communicated to the service provider with the form response may also be stored.

It can then be determined at step 718 if the incoming payment transaction requested by the form response is fraudulent. Specifically, in making such a determination, for each of the FP lists present in the service provider system, that FP list may be accessed at step 720 and an identifier to compare to that FP list may be generated for the incoming payment transaction at step 722. The identifier created for the incoming payment transaction corresponding to a particular FP list may be of the same format (e.g., contain the same data or type of data) as each identifier in the FP list. The data, or type, of an identifier for each FP list may be determined utilizing that FP rule that created the FP list, the corresponding FP rule, by configuration data previously established or by some other method The current identifier generated for the incoming payment transaction may be compared, at step 724 to the identifiers contained in the FP list to determine if the current identifier matches any of the identifiers of the FP list. If the current identifier matches one of the list of identifiers in the FP list the incoming payment transaction may be identified as a fraudulent transaction at step 726. This identification may include placing a flag in association with data for the form response that requested the payment transaction that indicates the requested payment transaction associated with that form response has been identified as potentially fraudulent.

After all the FP lists have been processed, if the incoming transaction has been flagged as fraudulent at step 728 (e.g., the identifier(s) created for the incoming payment transaction corresponding to each FP list matches an identifier in the FP list), a response to the received form response may be determined at step 730 and returned to the user who initiated the payment transaction through the form response at step 732 without ever submitting the payment transaction to a payment gateway. The response that is sent in such cases may be almost any response desired. In certain embodiments, such a response may be chosen to alert, or avoid alerting, a user at the user devices that may be a fraudulent user such as a scammer or the like, that his behavior has been detected.

In particular, in certain embodiments, a service provider may create a FP form definition for the response message using a FP form definition template and return this response form definition to the widget at the user's device, where it is rendered by the widget and presented to the user at the user device. This response message may include an indication of success (despite that the payment transaction was never submitted to the payment gateway), a decline (again, despite that the payment transaction was never submitted to the payment gateway), an error message (e.g., an indication that a system or communication error has occurred) or some other response.

Returning to step 728, if the payment transaction has not been identified as fraudulent it may be submitted to a payment gateway at step 732 substantially as detailed above. In one embodiment, a flow might include checking the identifier of the incoming form response against any whitelist(s) and then proceeding to step 728 if there is a match of that identifier in the whitelist.

After reading the above description it will be noted that embodiments of certain fraud prevention systems and methods as described prevent fraud by utilizing aggregated data from across the distributed computer network obtained in conjunction with other payment transactions. While the embodiments described are extremely effective in preventing fraud, it may also be desired to implement fraud prevention systems and methods that may operate within the context of a single payment transaction. Specifically, it may be desired to implement systems and methods that may be utilized in conjunction with forms presented to a user to determine if that user is fraudulent. While certain mechanisms may be used with the web pages (e.g., of a merchant organizations or forms therein) to determine if it is a human user (e.g., and not an automated script) interacting with the web page, these often provide impediments (or "friction") that may deter legitimate users. For example, CAPTCHA type systems require a user to manually identify an image or text and enter corresponding information into an entry window. If the image or text presented matches the information typed by the user, then the user is deemed a human user (i.e., not a script) and may proceed. Often however, such images or text presented for CAPTCHA are indecipherable and require more than one entry by the user. Moreover, scammers are now utilizing automated scripts that are sophisticated enough to pull text data out of CAPTCHA images to enter into the CAPTCHA field. To combat this, the CAPTCHA images have become more complex, creating a vicious cycle of ever increasing image complexity (and thus ever increasing user difficulty). Additionally, the use of CAPTCHA images may present an impediment to a blind user; an auditory reading of the CAPTCHA data may present an impediment to use of the web site by a deaf user, etc.

In these types of cases, legitimate users (e.g., potential donors in the case where a merchant organization is a charitable or non-profit organization) are likely to simply give up utilizing the web site (and the merchant organization may thus lose a potential donation). Even when CAPTCHA text and images are decipherable, however, it has been found that they present an impediment in part because they are an additional step not related to the desired transaction, thus causing additional "friction." According to some studies, the likelihood of a first time donor making a donation through a web site falls fifty percent for each additional screen or page requiring user input or interaction.

Accordingly, embodiments of the fraud prevention methods and systems presented here may configure a web page (or a form appearing therein) that determines that users are actually an automated script (i.e., a non-human user machine processing the web page in order to generate a response). More particularly, in one embodiment, a web page including one or more "invisible" questions (or fields) may be generated in response to a request for the web page. These invisible fields are fields included in the code of the web page that are not visible to a human user when the web page is rendered by a browser and presented to the user. While not visible in the rendered web page being presented to the user (and thus not requiring any attention or input by the user), such invisible fields may nevertheless be identified by an automated script processing the code of the web page (e.g., identified by the automated script as a field that needs to contain a value or a value of a particular type). If a value (or incorrect, different, etc. value) for such an invisible field is received through a web page including such an invisible field the user interacting with the web page may be identified as potentially fraudulent (e.g., it may be an automated script). Embodiment of these techniques are thus referred to as "reverse CAPTCHA" as, rather than requiring a user to verify themselves as human as in CAPTCHA, embodiments allow the user to implicate itself as an automated script. Embodiments of this reverse CAPTCHA may thus be utilized in the context of a single payment transaction to prevent fraud in association with that payment transaction. Moreover, embodiments of reverse CAPTCHA may be used in tandem with embodiments of fraud prevention systems and methods as described above that use aggregated data to further increase the efficacy of fraud prevention techniques implemented in a distributed network architecture.

Figure 8:
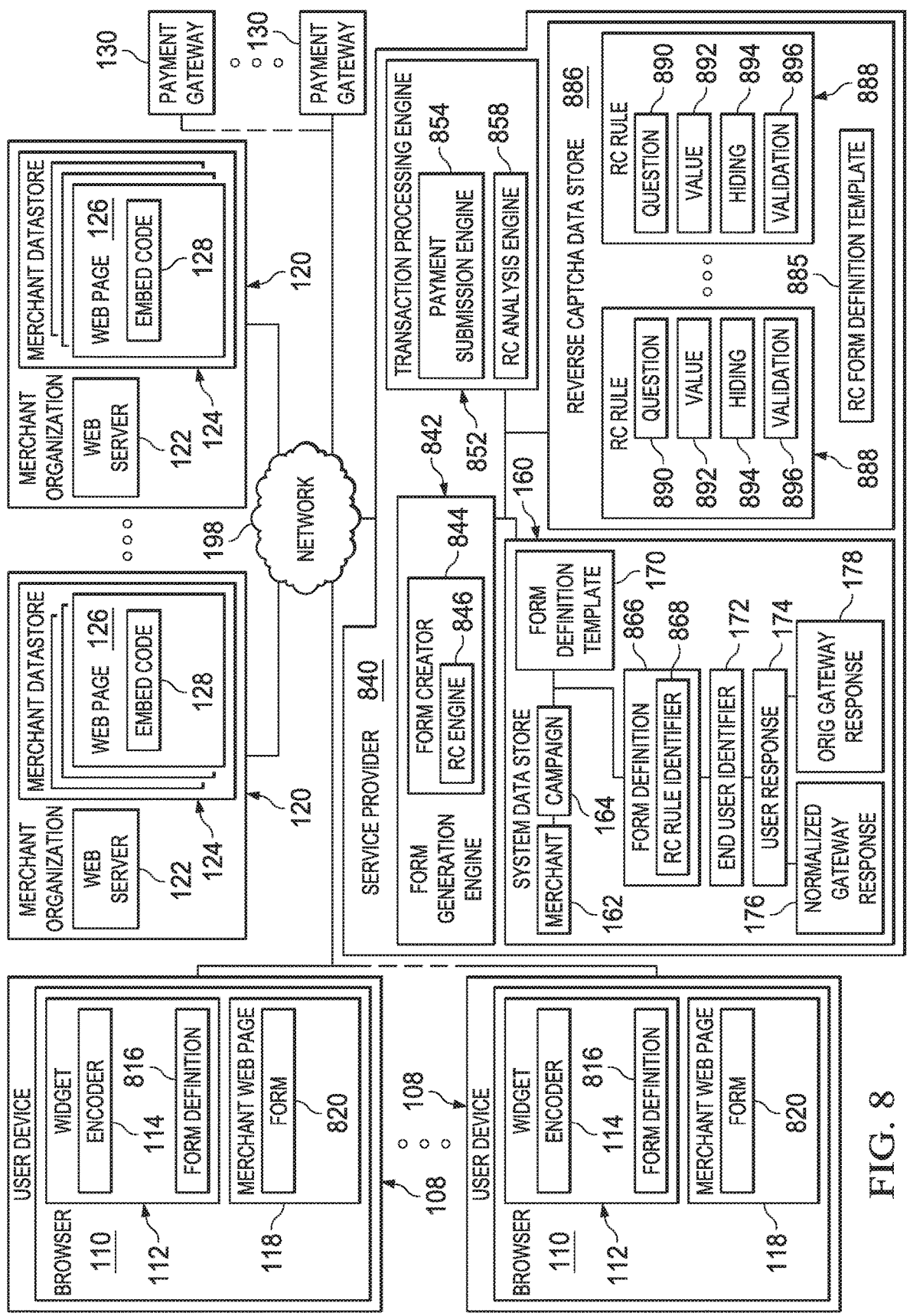
FIG. 8 is a diagrammatic representation of an architecture including an embodiment of a service provider system.

FIG. 8 depicts a diagram of an architecture of a distributed network computer system for conducting online payment transactions that includes an embodiment of a service provider system that performs reverse CAPTCHA. While embodiments of reverse CAPTCHA are depicted in conjunction with systems and method for conducting online payment transaction, it will be noted that other embodiments of reverse CAPTCHA system and methods may be effectively utilized in almost any distributed computer network environment where it is desired to determine or validate users of web pages in the network environment. Again, certain components of the architecture given the same reference numerals as corresponding components in FIG. 1 may function substantially similarly to the description given above and will not be elaborated on in more detail except to explain any different or additional functionality that may be included with such components.

Here, service provider 840 is coupled to user devices 108, merchant organizations 120 and payment gateways 130 over network 198. Merchant organization 120 may be a for-profit or non-profit organization that, as part of its operations, needs to conduct online payment transactions. To facilitate interaction with users and conducting online payment transactions with these users, the merchant organization 120 may include a web server 122 and one or more web pages 126 in an associated data store 124. Users may access these web pages 126 through a browser 110 on user devices 108. Merchant organization 120 may utilize service provider 840 to provide a portion associated with the web page 126 that allows a user to submit the actual payment information required for payment transactions (e.g., a name, credit card or bank information, amount, and the like).

Service provider 840 includes a system data store 160 that includes merchant data 162 (such as an object, data in a table, etc.) for a merchant organization 120 and data 164 for each campaign of that merchant organization 120. The data 164 for a campaign is in turn associated with one or more form definition templates 170. Each form definition template 170 may be associated with a unique identifier and define the data that may be used in the construction of a form definition such as the pages, sections, questions (e.g., what fields, types and labels of traditional form data to be entered), encoding, prefill data (e.g., what questions should be pre-filled with data if possible) along with other options or other definitions. These form definition templates 170 may be at least partially defined by the merchant organization 120 to obtain the data desired by the merchant organization or needed by a payment gateway 130 associated with the merchant organization 120 or a campaign of that organization 120. Additionally, the form definition template 170 or campaign data 164 may be associated with a style definition (e.g., a cascading style sheet (CSS) or the like) that defines an appearance of a form created for the campaign or created from the form definition template 170.

One or more web pages 126 provided by the merchant organization 120, including those through which payment information is to be obtained, may include an embed code 128. This embed code 128 can cause the web browser 110 rendering the merchant organization's web page 126 to request a widget 112 from service provider 840. The embed code 128 may also contain a form identifier corresponding to a form definition template 170 (which may be appropriate for a campaign being conducted by the merchant organization 120 associated with that web page 126). The widget 112 sends a request for the form identifier contained in the embed code 128 to the service provider 840. The widget 112 may also create a unique user identifier associated with user device 108 or a user on the user device 108, and provide that user identifier with the form identifier in the request to the service provider 840.

Service provider 840 may therefore receive requests for forms from widget 112 where the requests include a form identifier or a user identifier. The service provider 840 may store user response data 174 including the user identifier 172 and other data associated with the request (e.g., data that may be determined about the request such as IP address, browser type, language, encoding, etc.) in the data store 160. Service provider 840 may also provide the form request to form generation engine 842. Form generation engine 842 may determine the form definition template 170 associated with the form identifier contained in the request.

Form creator 844 may access data store 160 to obtain the form definition template 170 associated with the form identifier contained in the form request received from the widget 112. The form creator 844 may process the form definition template 170 to generate an initial form definition. Specifically, the form creator may use the form definition template 170 (and possibly any data 172 in the data store 160 about the user) to generate the initial form definition. The form creator 844 may determine which questions to include in the form, which of those questions to prefill with data if it is available (and what data to utilize), globalization or internationalization data, or other data to create the form definition. The initial form definition can thus include JavaScript Object Notation (JSON) data that may be used to define a form. Additionally, the initial form definition may include one or more CSS style sheets that may be used in the rendering of the initial form definition.

Once the form creator 844 creates the initial form definition, it can be processed by reverse-CAPTCHA (RC) engine 846. RC engine 846 may modify the initial form definition created by the form creator 844 to include one or more reverse CAPTCHA fields. Specifically, RC data store 886 includes one or more RC rules 888. Each of these RC rules 888 may include a question definition 890 defining a field (e.g., a field type or name). The rule 888 also includes a value definition 892 defining if a field for that rule 888 should have no value or a value (e.g., initial or default) associated with it; and if a value is associated with the field what that value should be (or how to create such a value). Associated with that value definition 892 may be a validation definition 896 defining how a value returned in the field from a user should be validated based on value definition 892. A hiding definition 894 for the rule may specify how a field defined by the rule 888 may be hidden from presentation to the user when a browser 110 renders a web page including a field in accordance with the rule 888. These rules 888 may be generated by an administrator of the service provider system 840 (e.g., using an administrator interface, not shown) and stored in the RC data store 886. These rules 888 may be created or updated asynchronously to the functioning of the remainder of the service provider system 840 and may be updated frequently in order to increase the effort required by developers of automated scripts to determine or otherwise circumvent or adapt to the reverse CAPTCHA fields included in web pages based on such rules 888. Embodiments of such rules 888 or aspects thereof will be discussed in more detail herein at a later point.

Accordingly, RC engine 846 may access RC data store 886 and select one or more rules 888 to utilize. In one embodiment, which rule(s) 888 and the number of rules 888 selected by RC engine 846 may be substantially random, such that every time RC engine 846 processes an initial form definition the rules 888 (and number thereof) utilized may be random. Utilizing a random selection process may again increase the effort required by developers of automated scripts to determine or otherwise circumvent or adapt to the reverse CAPTCHA fields included in web pages based on such rules 888 as different reverse CAPTCHA fields may be included in different forms and different instances of the same form (e.g., even when the same web page is reloaded in the same browser 110).

Once RC engine 846 has selected one or more RC rules 888 to utilize, for each rule 888 selected the RC engine 846 modifies the initial form definition to include the field defined by the question definition 890 of the rule 888, including any value for that field as defined by the value definition 892. The RC engine 846 also modifies the initial form definition to include code for hiding the field according to the hiding definition 894 of the rule 888. The modification of the initial form definition to include such a field or value may include inserting JSON data into the initial form definition (e.g., that defines field with a name, type or value) or a style definition into a CSS of the form definition (e.g., that defines how a field is to be hidden").

Once the initial form definition has been modified by the RC engine 846 to include the reverse CAPTCHA fields, the form definition 816 (including the reverse CAPTCHA fields) is returned to the requesting widget 112 at the user device 108 in response to the form request. Additionally, the form generation engine 842 stores data 866 for the created form definition 816 in the data store 160 at the service provider 840 in association with the user data 172 and the form definition template 170. This form definition data 866 may include data on the questions, prefill, style, etc. of the form definition 816 that was sent to the widget 112 at the user's device 108 in response to the request. In particular, the form definition data 866 may include RC rule identifier(s) 868 that each are associated with a corresponding rule 888 that was utilized to include reverse CAPTCHA fields in the form definition 816 returned to the user. In some embodiments, a rule identifier 868 may be associated with a value given to the reverse CAPTCHA field created based on that rule 888 in the form definition 816. Such a value may be included in the form definition data 866 when, for example, it may be difficult or impossible to recreate such a value based on the value definition 892 of the rule 888, other form definition data 866 or a received form response.

When the widget 112 receives the form definition 816 in response to the form request, it processes the form definition 816 to render form 820 in the rendered web page 118 presented in the browser 110. Such a rendering may occur by generating code that can be presented by the browser 110. In cases where the user is intended to enter payment information utilizing the rendered web page 118 the form 820 may be a payment form that includes a set of questions (e.g., fields) into which the user may enter payment information such as card information, a card verification value (CCV) number, a name, address, zip code, amount, etc. The form 820 may also include one or more reverse CAPTCHA fields that are not visible on form 820 (e.g., because they are hidden, not displayed, behind other elements of the form, displayed in a location that is not displayable, etc.). In cases where a user is a human user, the user will only be able to see and complete the displayed fields on the form (e.g., not the hidden reverse CAPTCHA fields of the form 820).

As discussed above, however, in the case where the user entering data into the fields of the form 820 is an automated script, the automated script may process the code of the form 820 (e.g., the HTML or other code generated by the widget 112 that caused the browser 110 to present the form 820 in the web page 118). When the code for the form 820 is processed, the reverse CAPTCHA fields included in the code for the form 820 may be detected, despite that such reverse CAPTCHA fields would not be visible to a user viewing the form 820 in the web page 118. Thus, an automated script processing the code of form 820 and attempting to complete the fields of form 820 to submit payment information may provide values for these reverse CAPTCHA fields, either by including values for such fields or by changing the initial or default value of a reverse CAPTCHA field.

In either scenario, this form data, including the payment information or data for other fields, entered by the user or otherwise, may be returned to the service provider 840. In particular, the form data, including the payment information entered by the user into the form 820 presented through the browser 110 may be received by the widget 112 and returned to the service provider 840 using, for example, an HTTPS POST. In certain embodiments, at least a portion of the form response from the widget 112 to the service provider 840 may be an encoded value, created for example, using a hash, encryption or a binary code. So, instead of passwords, credit card numbers, CCV numbers, or other sensitive data being in clear text, such data may be contained in the encoded value that is passed. The widget 112 and the service provider 840 are therefore provided with respective encoder software modules 114 that may encode or decode the value using for example a hashing algorithm, encryption or binary coding such that the form data or a portion thereof may be encoded before transmission. By encoding the form data passed between the widget 112 and the service provider 840 in this manner, the effort required by developers of automated scripts to determine or otherwise circumvent or adapt to the reverse CAPTCHA fields included in web pages may be increased significantly, as the observation of any reverse CAPTCHA fields and any values associated therewith included in a form may be made substantially more difficult (e.g., as they are communicated between the widget 112 and the service provider 840).

Once the form response data, including the payment information entered by the user and any values for the reverse CAPTCHA fields, is returned to the service provider 840 (and decoded in cases where any values of the form data are encoded), this user response 174 (also known as a form response) including the form data may be stored in the data store 160 in association with the user identifier 172 and form definition 866 originally sent to the user.

The received payment information and any other desired form data, including any values for the reverse CAPTCHA fields may be provided to transaction processing engine 852. The transaction processing engine 852 may provide the form data to RC analysis engine 858. RC analysis engine 858 may access the form definition 866 corresponding to the form definition 816 for the form through which the form data was generated. In particular, the RC analysis engine 858 may access the RC rule identifier(s) 868 to determine which RC rules 888 were utilized to include reverse CAPTCHA fields in the form definition 816. For each of the RC rule identifiers 868, the RC analysis engine 858 may determine the field using the question definition 890 to determine the value (which may be an empty value) for that reverse CAPTCHA field in the form data. Moreover, the validation definition 896 of the rule 888 may be used by RC analysis engine 858 to determine an expected value for the reverse CAPTCHA field and compare it with the value for that field in the form data to determine the user who submitted the form data was an automated script. In many cases, if there is a value in the form data for a reverse CAPTCHA field that had no value (i.e., an empty field) or an initial or default value for the reverse CAPTCHA field has been changed, it can be determined that the form response was submitted by an automated script.

In certain embodiments, the validation definition 896 may define, for that RC rule 888 how to validate the value for the corresponding reverse CAPTCHA field returned in the form data to determine if the returned value in the form data indicates that the user who submitted the form data was an automated script. Specifically, the validation definition 896 for a rule 888, may define how to generate an expected value for comparison (e.g., which may be an empty value) based on the value definition 892 for that rule 888 and compare that excepted value with the value received in the form data for the reverse CAPTCHA field defined using that rule 888. For example, in cases where the value definition 892 indicates that a reverse CAPTCHA field should not have a value, the validation definition 896 may define an expected value that is empty and determine if any value was returned in the corresponding reverse CAPTCHA field in the form response. As another example, in cases where a value for a reverse CAPTCHA field may be a timestamp of date information, the validation definition 896 may define how an expected value for such a timestamp or date information can be created for comparison and determine if the value for that reverse CAPTCHA field in the form data matches the expected value.

If the expected value for an RC rule 888 does not match the value for the corresponding reverse CAPTCHA field included in the form data the incoming payment transaction may be identified by transaction processing engine 852 as a fraudulent transaction. This identification may include placing a flag or other data in system data store 160 in association with the data 174 for the form response that requested the payment transaction that indicates the requested payment transaction associated with that form response has been identified as potentially fraudulent. If the incoming transaction has not been flagged as fraudulent (e.g., the values for the reverse CAPTCHA fields in the form response match the expected values for those fields created based on the RC rules 888 used to generate those fields), the transaction processing engine 852 may then determine a payment gateway 130 associated with the incoming payment transaction and submit the payment transaction to the payment gateway 130 using payment submission engine 854 as previously discussed.

If however, the incoming payment transaction has been identified (e.g., flagged) as fraudulent by the transaction processing engine 852, a response may be sent back to the user at the user device 108, without ever submitting the requested payment transaction to a payment gateway 130. The response that is sent in such cases may be almost any response desired. In certain embodiments, such a response may be chosen to alert, or avoid alerting, a user at the user devices that may be a fraudulent user such as a scammer or the like, that his behavior has been detected. As noted above the response may indicate success when the incoming payment request has been identified as fraudulent, may include a fail or decline message, may attempt to "scam the scammer" by sending back illegitimate confirmation messages, or may send back some other response.

In particular, in certain embodiments, the service provider 840 may communicate one or more response messages to the user via the widget 112 intended for potentially fraudulent users. In particular, the service provider 540 may create a RC form definition for the response message using a RC form definition template 885 (or another form definition template 170 that may be associated with the merchant 162 or the campaign 164) and return this response form definition to the widget 112, where it is rendered by the widget and presented to the user at the user device 108. The newly rendered form may, for example, replace form 820 previously presented to the user, may be rendered in a pop-up window, etc. This response message may again include an indication of success (despite that the payment transaction was never submitted to the payment gateway 130), a decline (again, despite that the payment transaction was never submitted to the payment gateway 130), an error message (e.g., an indication that a system or communication error has occurred) or some other response. In other embodiments, the RC form definition created may include a random message or a simple invalid card message. Other messages are possible and are contemplated herein.

In this way, the fraudulent user will not receive a reliable answer from the service provider system 840 and because the fraudulent user does not actually know whether the payment information they submitted with the payment transaction request may no longer attempt to use the service provider system 840 or web sites of merchant organizations 120 that utilize the service provider 840.

Figure 9A:
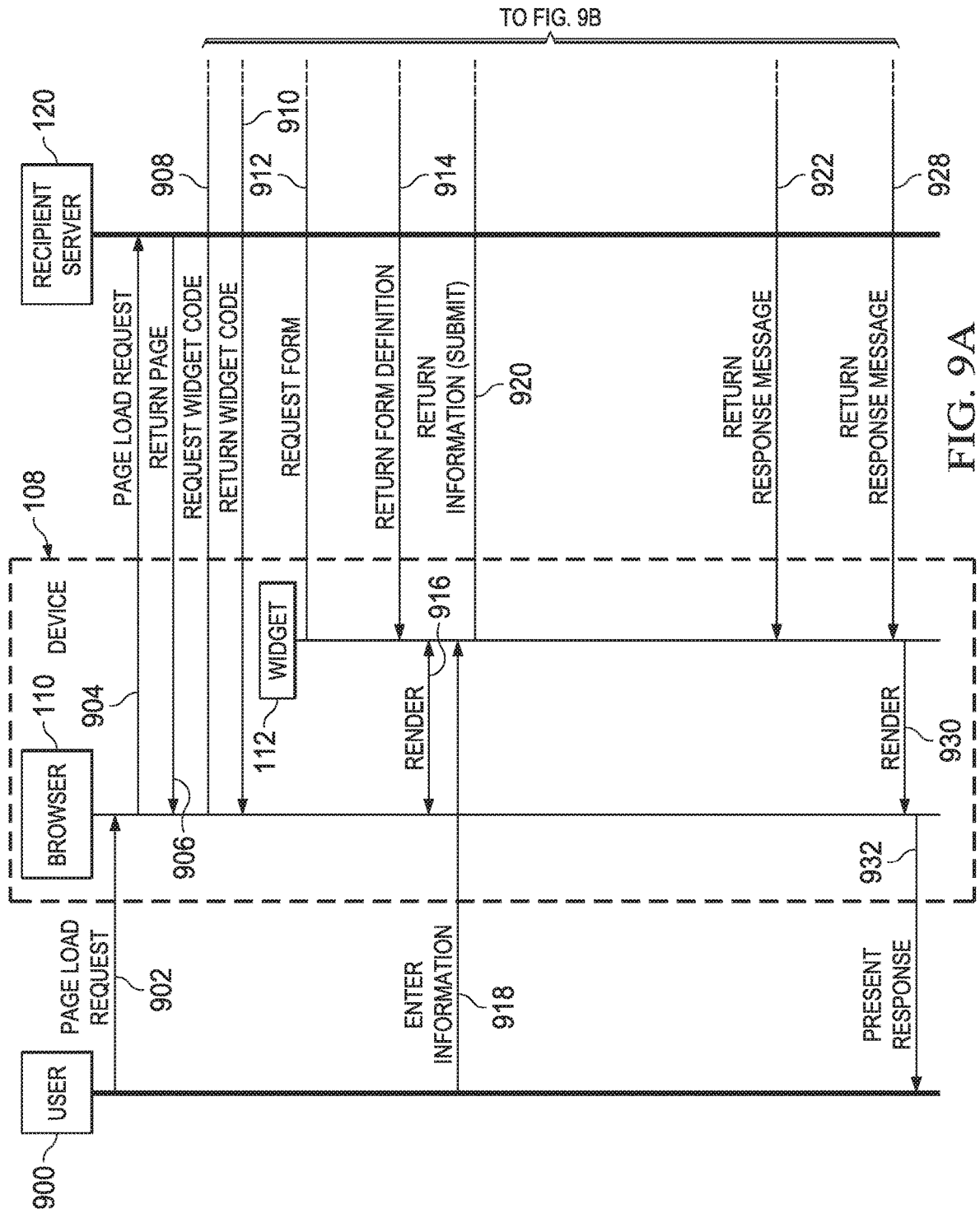
FIGS. 9A and 9B are a sequence diagram showing operation of an embodiment of the systems and methods disclosed.
Figure 9B:
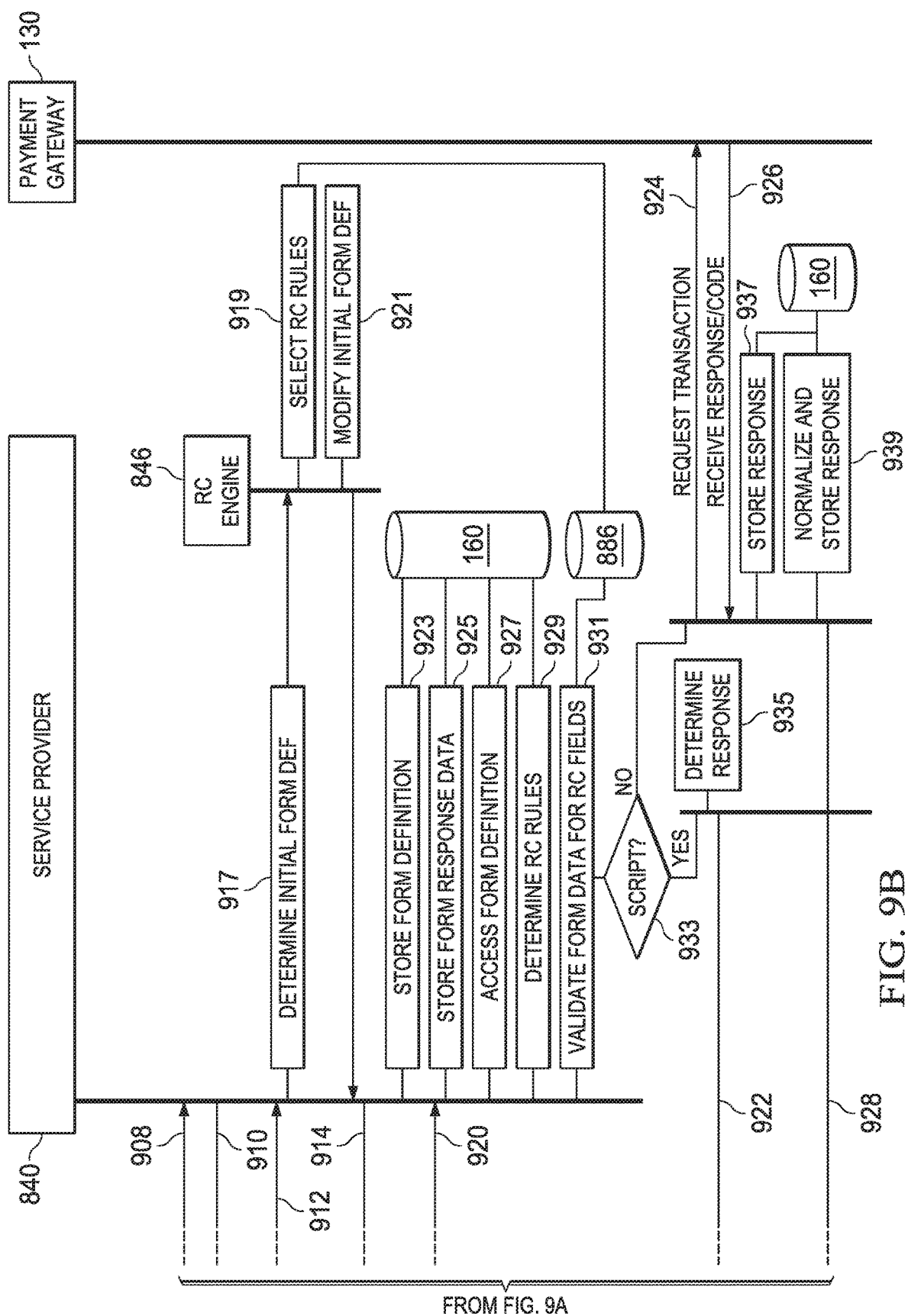

In FIGS. 9A and 9B a sequence diagram illustrating one embodiment of a sequence of communication within an architecture having components similar to those of FIG. 8 is depicted. Chronological time is illustrated proceeding from the top to the bottom of FIGS. 9A and 9B. The user 900 may access a web page of a merchant organization 120, including a web page with payment functionality, through an input to his browser 110 (reference numeral 902). Based on this access, the browser 110 may send a request to the server of the merchant organization 120 for the accessed web page (reference numeral 904), which is returned to the browser 110 (reference numeral 906). The embed code within the web page may then cause the browser to issue a request (reference numeral 908) for the widget to service provider 540 which returns the widget 112 to the browser where it is executed by the browser 110. Additionally, based on the form identifier contained in the embed code of the web page, a request (reference numeral 912) for a form definition (e.g., corresponding to the form identifier or the user 900) may be issued through the browser 110 to the service provider 840.

The service provider 840 may create an initial form definition, and this initial form definition provided to the RC engine 846 (reference numeral 917_. The RC engine 846 may access the RC data store 866 to select one or more RC rules contained therein (reference numeral 919). In one embodiment, the selection of the RC rules may be randomized as to both the number of RC rules selected and which RC rules are selected. Once the RC rules to apply have been selected the initial form definition may be modified according to the selected RC rules (reference numeral 921). As discussed, the initial form definition may be modified to include the reverse CAPTCHA fields and any value for that field as defined by selected RC rules, where the initial form definition is also modified to hide those fields according to the respective selected RC rule.

The service provider 840 can store data for this form definition (reference numeral 923) in the system data store 160 and return (reference numeral 914) the form definition (as modified by the RC engine 846) to the widget 112 through the browser 110 (reference numeral 916). Widget 112 then renders the returned form definition (reference numeral 916) such that it can be presented to the user through the browser 110 in conjunction with the rendering and presentation of the web page through the browser 110. The user 900 can then enter the payment information requested by the form using the fields provided by the form in the web page (reference numeral 918). If payment information is entered into a payment form, the payment information generally includes a payment amount and at least one payment identifier, such as a credit card number or a bank routing number and bank account number, and may include additional information such as a user name or identifier, user physical or electronic mail address, etc.

This payment or other information is received by the widget 112 and returned (reference numeral 920) to the service provider 840. The returned form data is stored (reference numeral 925) at the service provider 840 in the system data store 160. Accordingly, when the form response requesting a payment transaction is received (reference numeral 920), the RC rules used to create reverse CAPTCHA fields in the form utilized by the user to provide the form response can be determined by accessing the form definition associated with that form response in the system data store 160 (reference numeral 927) and identify the RC rules utilized from that stored form definition (reference numeral 929). The RC rules used to create the reverse CAPTCHA fields can then be used to validate the values of the returned form data corresponding to those reverse CAPTCHA fields (reference numeral 931).

For each of the RC rules identified, a value (which may be an empty value) for that reverse CAPTCHA field in the form data as received (reference numeral 920) may be determined. An expected value for the reverse CAPTCHA field may also be determined. Such an expected value may be stored in system data store 160 in the stored form definition or may be determined utilizing the corresponding RC rule. The expected value may be compared with the value for that reverse CAPTCHA field as received in the form data to determine if the user who submitted the form data was an automated script (reference numeral 933). In many cases, if there is a value in the form data for a reverse CAPTCHA field that had no value (i.e., an empty field) or an initial or default value for the reverse CAPTCHA field has been changed, it can be determined that the form response was submitted by an automated script.

If the payment transaction is identified as being submitted by a user which is an automated script (reference numeral 933) the service provider 840 can determine a response message (reference numeral 935) and communicate the response messages (reference numeral 922), such as an indication of success or denial, an error, a request for additional information or almost any type of response desired, to the widget 112.

If the payment transaction is not identified as being submitted by an automated script the service provider 840 may utilize the form data of the payment transaction to submit a request (reference numeral 924) for the payment transaction to a payment gateway 130. The payment gateway 130 will process the transaction using the payment information and return one or more responses including a transaction code or other data to the service provider server 840 (reference numeral 926).

The service provider 840 receives this gateway response and stores the original payment gateway response (reference numeral 937) in association with an identifier for the user 900, the merchant organization 120, the form definition sent to the user 900 and the form data including the payment information provided by the user 900. Additionally, the service provider 840 may normalize the original gateway response, or portions thereof, to determine a normalized service provider code or other normalized data and store such normalized response data (reference numeral 939) in the data store 160 in association with the identifier for the user 900, the merchant organization 120, the form definition sent to the user 900, the form data including the payment information provided by the user 900 and the original payment gateway response. The service provider 840 may then communicate one or more response messages (reference numeral 928), such as an indication of success or denial, an error, a request for additional information or almost any type of response desired, to the widget 112 based on the response received from the payment gateway 130. The response message returned by the service provider 840 may be rendered (reference numeral 930) by the widget 112 to present the response to the user 900 through the browser 110 (reference numeral 932).

Figure 10:
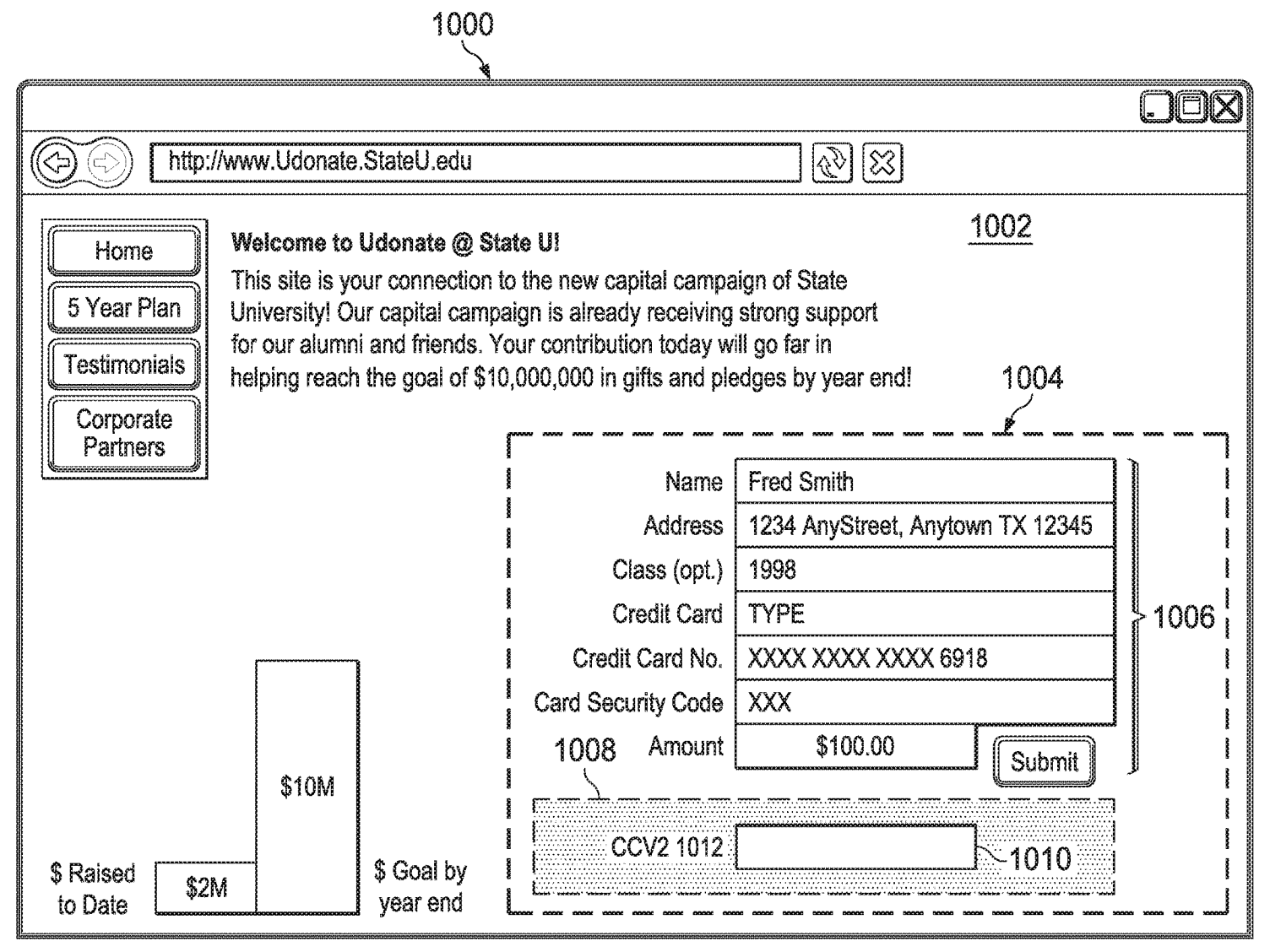

FIG. 10 depicts an example web page 1000 that may be rendered on a user's computer. The web page 1000 may include merchant organization content 1002 as well as the rendered form definition 1004. As can be seen, the rendered form definition includes fields 1006 corresponding to fields (e.g., fields for entering payment information including traditional credit card information) that are visible to a human user. In addition, in accordance with embodiments, a hidden field 1008 is included in the rendered form definition 1004. The hidden field 1008 may include a label 1012 (e.g., "CCV2") as well as the entry field 1010 itself. Because it is hidden, as indicated by the dashed lines, a human user does not see it. However, automated script that scans the code of the web page (e.g., HTML, JSON objects, etc.) would likely identify it as requiring an entry.

Figure 11:
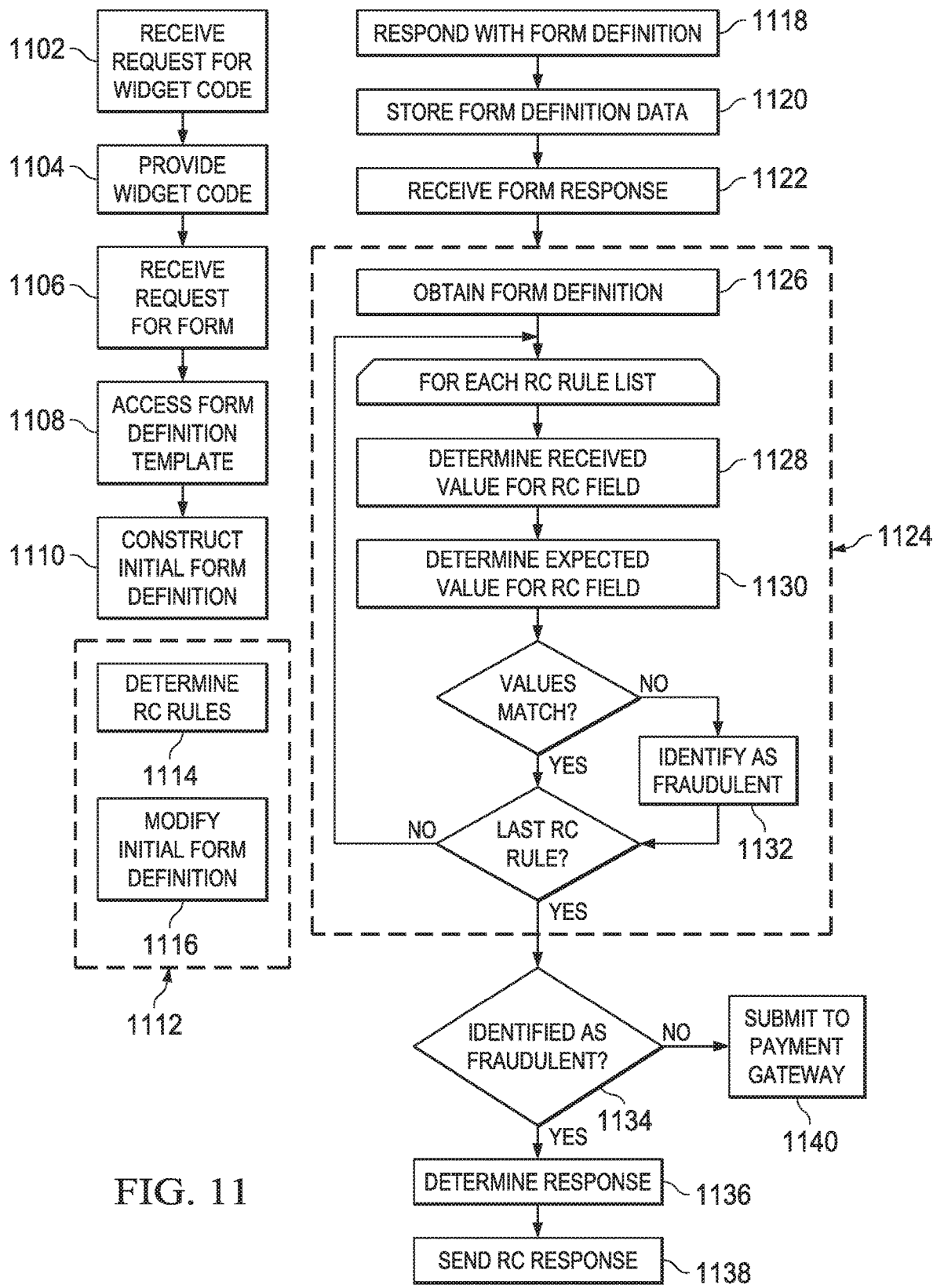
FIG. 11 is a flow diagram depicting one embodiment of a method for implementing reverse CAPTCHA.

Referring to FIG. 11, one embodiment of a method for reverse CAPTCHA that may be implemented at a service provider is depicted. Initially, at step 1102 the service provider may receive a request for the widget. The widget may thus be returned in response to the request at step 1104. The service provider may then receive a request for a form at step 1106. When the service provider system receives the form request at step 1106, it may identify and access a form definition template associated with the form identifier at step 1108. This form definition template can then be utilized to generate an initial form definition at step 1110. The initial form definition can then be modified to include one or more reverse CAPTCHA fields at step 1112.

In one embodiment, a set of RC rules to utilize for the modification of the initial form definition may be determined at step 1114. The selection of how many, and which, RC rules to utilize may be substantially random. In one embodiment, each of the RC rules may include a "should use" definition indicating whether that RC rule should be utilized. This "should use" definition can, for example, be a function that performs a mathematical operation or the like on a substantially random number such as a unique identifier (e.g., an identifier for a form definition or a user) and determines if the associated rule should be used based on the result of that operation. Thus, each time the form definition "should use" definition of a rule is executed the result of the execution will indicate if that RC rule should be utilized. Thus, in this embodiment, executing the "should use" definition of each RC rule may perform the selection of the RC rules to apply.

Once the one or more RC rules to utilize are selected the initial form definition may be modified according to each of the selected RC rules at step 1116. In particular, in one embodiment, each of the RC rules may include a question definition defining a field (e.g., a field type or name). An RC rule also includes a value definition defining if a field for that rule should have no value or a value (e.g., initial or default) associated with it; and if a value is associated with the field what that value should be (or how to create such a value). A hiding definition for the rule may specify how a field defined by the RC rule may be hidden from presentation to the user. For each RC rule selected then, the initial form definition may be modified to include the field defined RC rule, including any value for that field as defined by the RC rule. The initial form definition is also modified such that it is configured, when rendered, to hide the field according to the hiding definition of the RC rule.

Once the initial form definition has been modified to include the reverse CAPTCHA fields, the form definition (including the reverse CAPTCHA fields) is returned to the user device in response to the form request at step 1118. Additionally, data for the form definition is stored at step 1120. The data stored for the form definition includes data for identifying each of the RC rules used to modify the initial form definition to include the RC fields as utilized at step 1116.

The widget at the user's device receives the form definition and processes the form definition to render the form to present to the user in the browser in association with the rendered web page. The presented form may, for example, be a payment form that includes a set of questions (e.g., fields) into which the user may enter payment information such as card information, a CCV number, a name, address, zip code, amount, etc. Additionally, each of the RC fields as included in the form definition are rendered by the widget and included in the form presented to the user. However, because such fields are hidden they are not visible to a user viewing the presented form in the browser.

As such, in cases where a user is human user, the user will only be able to see and will only complete (e.g., provide data for) the visible fields on the form presented in the browser (e.g., not the hidden reverse CAPTCHA fields of the form). Conversely, in the case where the user entering data into the fields of the form is an automated script, the automated script may process the code of the form and detecting the reverse CAPTCHA fields included in the code for the form, despite that such reverse CAPTCHA fields would not be visible to a user viewing the form in the browser. Thus, an automated script processing the code of the form and attempting to complete the fields of form to submit payment information may provide values for these reverse CAPTCHA fields, either by including values for such fields or by changing the initial or default value of a reverse CAPTCHA field.

The form response data, including the values entered into the fields of the form, may be returned to the service provider at step 1122. In particular, the form response data, including the payment information entered by the user into the form or values for the RC fields included in the form may be received by the widget and returned to the service provider. It can then be determined at step 1124 if an automated script submitted the incoming payment transaction in the form response.

Specifically, in making such a determination, the stored form definition data associated with that form response may be obtained at step 1126. This form definition data includes data identifying each of the RC rules utilized to generate the form definition used to provide the form through which the data of the incoming form response was submitted. For each of the RC rules identified utilizing the data for the form definition, a value (which may be an empty value) for the reverse CAPTCHA field corresponding to that rule in the form data as received may be determined at step 1128. An expected value for the reverse CAPTCHA field may also be determined at step 1130. Such an expected value may be stored in the system data store in the stored form definition or may be determined utilizing the corresponding RC rule. The expected value may be compared to the received value for that reverse CAPTCHA field to determine if the user who submitted the form data was an automated script. Specifically, if the expected and received values do not match the incoming payment transaction may be identified as fraudulent at step 1132. This identification may include placing a flag in association with data for the form response that requested the payment transaction that indicates the requested payment transaction associated with that form response has been identified as potentially fraudulent.

In particular, in one embodiment, the RC rule may include a validation definition defining how a value returned in the field from a user should be validated based on value definition. In particular, the validation definition may be a function that can determine the value of the RC field as returned in the form data and generate the expected value for the RC field for that form response for that RC rule and compare the expect value with the received value for that reverse CAPTCHA field to determine if the user who submitted the form data was an automated script. Thus, in this embodiment, for each RC rule identified through the form definition the corresponding validation definition may be executed to determine if the if the user who submitted the form data was an automated script.

After all the identified RC rules have been processed, If the incoming payment transaction has been flagged as fraudulent at step 1134 (e.g., for at least one RC rule the expected value for a corresponding reverse CAPTCHA field does not match the received value in the form response for that reverse CAPTCHA field), a response to the received form response may be determined at step 1136 and returned to the user who initiated the payment transaction through the form response at step 1138 without ever submitting the payment transaction to a payment gateway. The response that is sent in such cases may be almost any response desired. In certain embodiments, such a response may be chosen to alert, or avoid alerting, a user at the user devices that may be a fraudulent user such as a scammer or the like, that his behavior has been detected.

In particular, in certain embodiments, a service provider may create an RC form definition for the response message using an RC form definition template and return this response form definition to the widget at the user's device, where it is rendered by the widget and presented to the user at the user device. This response message may include an indication of success (despite that the payment transaction was never submitted to the payment gateway), a decline (again, despite that the payment transaction was never submitted to the payment gateway), an error message (e.g., an indication that a system or communication error has occurred) or some other response.

Returning to step 1134, if the payment transaction has not been identified as fraudulent it may be submitted to a payment gateway at step 1140 substantially as detailed above.

It may now be useful discuss embodiments of RC rules, or aspects thereof in more detail. In particular it may be useful to discuss the ways that reverse CAPTCHA fields may be hidden. In some embodiments, for example, a reverse CAPTCHA field can be hidden using a DisplayNone tag; in others, a reverse CAPTCHA field could be positioned off screen. In still others, a reverse CAPTCHA field could be made "light" with a more opaque field over it. In another embodiment, a reverse CAPTCHA field can be visible as a replacement field that matches the "real" field's display, then applies one of the other display rules to the "real" field. When data is collected, the "real" field will get populated with this field's value As but one example, the HTML for a reverse CAPTCHA field (e.g., as rendered by a widget at a user's browser) may appear as follow:

<input name="myarg" value="myvalue" type="hidden">

If the above is utilized in a form, the data myarg=myvalue will be submitted as the reverse CAPTCHA field and the associated value in a form response (e.g., along with the other data submitted), assuming the value is not altered.

In another embodiment, a sort order may be specified as a hidden field. For example, shown below is an example of a form where the default sort order is specified as a hidden field.

almost any context that utilizes web pages in a distributed computer network environment. For example, embodiments of reverse CAPTCHA may be effectively utilized in conjunction with web servers that provide content such as web pages in response to requests (e.g., from browsers or apps on a mobile device, etc.). In certain embodiments, a web server may receive a request for content (e.g., web page, etc.), where a reverse CAPTCHA field as discussed may be included in the content that is returned in response to the request. This reverse CAPTCHA field may be incorporated into a relatively static web page (e.g., the field and value may be pre-determined and included in the code for the web page that is stored and served in response to multiple requests). Thus, in such cases, it may be relatively easy to determine, for each response received, what an excepted value for the RC field in a response to such web page should be.

As noted above, however, while such an embodiment may give some ability to detect use of an automated script in conjunction with those web pages, dynamically or randomly determining a reverse CAPTCHA field (e.g., field, value, how it is to be hidden, etc.) may provide greater resistance against discovery and circumvention of the use of reverse CAPTCHA. Accordingly, when a request for content is received at a web server, the requested content may be retrieved based on the request and provided to a reverse CAPTCHA engine. The reverse CAPTCHA engine may determine a reverse CAPTCHA field or value as discussed above and modify the requested content to include this reverse CAPTCHA field (and value, etc.). The modified content may then be provided to the requesting device.

The reverse CAPTCHA field (and associated value, etc.) may be stored at the web server in association with identifying information associated with the received request such as the received request itself, the user or user device from which the request was received, etc. The reverse CAPTCHA field and identifying information may be stored, for example, in session data in association with the received request or provided response, in a data store associated with the user, etc.

```
<form method="get" id="searchform" action="http://www.klroo.org/">
<a href="http://www.klroo.org/newsletter/" class="klroo-social-link"><img
    src="http://www.klroo.org/wp-content/themes/klroo/images/newsletter-icon.png"></a>
<a href="http://www.facebook.com/KLROOAustinPBS" target="_blank" class="klroo-
    social-link"><img src="http://www.klroo.org/wp-content/themes/klroo/images/fb-
    icon.png"></a>
<a href="https://twitter.com/klroo" target="_blank" class="klroo-social-link" style="margin-
    right:12px;"><img src="http://www.klroo.org/wp-content/themes/klroo/images/tw-
    icon.png"></a>
<label for="s" class="assistive-text">Search KLROO</label>
<input type="text" class="field" name="s" id="s" placeholder="Search KLROO" />
<input type="submit" class="submit" name="submit" id="searchsubmit" value="Search
    KLROO" />
<!--<input type="hidden" name="order" value="desc" />
<input type="hidden" name="orderby" value="post_date" />-->
</form>
```

As other examples, Appendix B depicts examples of how RC fields may be hidden Appendix C depicts examples of how the values for RC fields may be generated and Appendix D depicts examples of RC rules that may be utilized to modify form definitions, generate values for those fields, validate values received for those fields, etc.

It will be noted that while embodiments of providing one or more reverse CAPTCHA fields have been discussed in the context of providing a payment form through a merchant's web page for payment transactions, other embodiments that utilize reverse CAPTCHA may be effectively applied in While the reverse CAPTCHA field may be included in the content sent in response to the request, when the content is rendered at the requesting user's device the reverse CAPTCHA field is not visible in the visual presentation of the content. Accordingly, when a response to the modified content is received at the web server an expected value for the reverse CAPTCHA field can be determined (e.g., as discussed above) and with the received value to determine if the response has been provided by an automated script.

Figure 12:
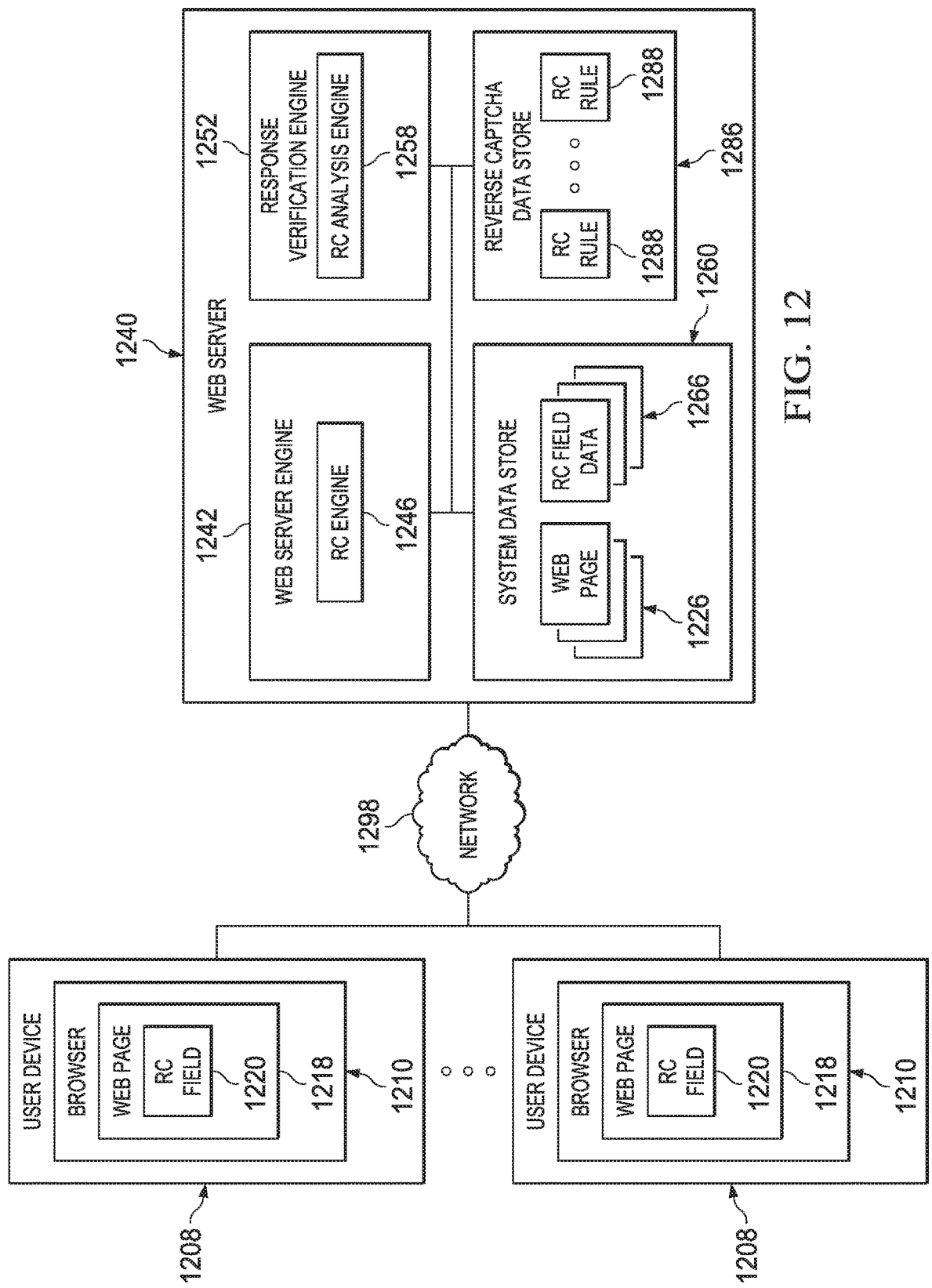
FIG. 12 is a diagrammatic representation of an architecture including an embodiment of a web server system.

FIG. 12 depicts one embodiment of a web server that utilizes reverse CAPTCHA. Here, a web server 1240 coupled to one or more user devices 1208 over a network 1298 includes a system data store 1260 having one or more web pages 1226. Based on a user interaction, a redirect, or other inputs or instructions, browser 1210 may issue a request for a web page 1226 to web server 1240. The web server engine 1242 may receive this request. The web server engine 1242 may access the web page 1226, as stored in system data store 1260 and return the web page 1226 to the browser 1210 in response to the request. It will be noted that returning of the web page 1226 may include returning all associated code or content in conjunction with web page 1226, include any code or content created by, for example, executing any server side code or scripts that may be utilized to dynamically create or include code associated with web page 1226, etc. The browser 1210 can then render the returned web page to the user at the user device 1242.

For a variety of reasons it may be desired to include a reverse CAPTCHA field in the returned web page. In such cases, the web server engine 1242 obtains the initial web page 1226 to return in response to a received request for the web page 1226. Once the initial web page 1226 is obtained it can then be processed by RC engine 1246 to produce a modified web page including an RC field to return in response to the request. Specifically, RC engine 1246 may modify the initial web page 1226 to include a reverse CAPTCHA field. In one embodiment, RC data store 1286 includes one or more RC rules 1288. Each of these RC rules 1288 may include a question definition defining a field (e.g., a field type or name), a value definition defining if a field for that rule 1288 should have no value or a value (e.g., initial or default) associated with it, and, if a value is associated with the field, what that value should be (or how to create such a value). Additionally, a validation definition may be associated with the RC rule 1288. This validation definition may define how a value returned in the field in a response from a user should be validated based on a value definition. A hiding definition for the rule 1288 may specify how a field defined by the rule 1288 may be hidden from presentation to the user when a web page including a field in accordance with the rule 1288 is rendered by a browser 1110.

Accordingly, RC engine 1246 may access RC data store 1286 and select one or more rules 1288 to utilize. In one embodiment, which rule(s) 1288 and the number of rules 1288 selected by RC engine 1246 may be substantially random, such that every time RC engine 1246 modifies a web page 1226 the rules 1288 (and number thereof) utilized may be random. Once RC engine 1246 has selected one or more RC rules 1288 to utilize, for each rule 1288 selected the RC engine 1246 modifies the initial web page 1226 to include the field and value defined by the rule 1288 where the field (e.g., and value) are configured to be hidden according to the hiding definition of the rule 1288 when the modified web page is visually displayed.

Once the initial web page 1226 has been modified by the RC engine 1246 to include the reverse CAPTCHA field, the modified web page (including the reverse CAPTCHA fields) is returned to the requesting browser 1210 at the user device 1208 in response to the initial request received from the browser 1210. Additionally, the web server engine 1242 stores data 1266 for the RC field included in the modified web page in the data store 1260 at the web server 1240. This data 1266 for the RC field may, for example, be included in the session data associated with a session being maintained in association with the browser 1210 at the user device 1208 or a user of user device 1208. Generally, the data 1266 for the RC field may be maintained in almost any manner that allows identification of, for example, the rule 1288 used to generate the RC field included in the modified web page returned or the RC field and associated value included in the modified web page.

When the browser 1210 receives the modified web page in response to the initial request, it renders the modified web page to present the rendered web page 1218. Here, the rendered modified web page 1218 includes RC field 1220 and an associated value, however, the RC field 1220 is not visible on web page 1218 visually presented in the browser 1210 (e.g., either because RC field 1220 is hidden, not displayed, behind other elements of the form, displayed in a location that is not displayable, etc.). In cases where a user is human user, the user will thus only be able to see and complete any displayed fields on the displayed web page 1218 (e.g., not the hidden reverse CAPTCHA field 1220).

Once any response to the modified web page, including any value for the reverse CAPTCHA field, is returned to the web server 1240 from the browser 1210 this response may be provided to the response verification engine 1252. The response verification engine 1252 may provide the received response data to RC analysis engine 1258. RC analysis engine 1258 may access the RC field data 1266 corresponding to the RC field in the modified web page sent to that browser 1210 at that user device 1208 in response to the initial request. Using this RC field data 1266 an expected value for the included reverse CAPTCHA field may be determined and compared with the value for that field in the received response data to determine if the user who submitted the form data was an automated script. In many cases, if there is a value received in the response for a reverse CAPTCHA field that had no value (i.e., an empty field) or an initial or default value for the reverse CAPTCHA field has been changed in the response data, it can be determined that the response was submitted by an automated script.

If the expected value for an RC field does not match the value for the corresponding reverse CAPTCHA field included in the received response data the response can be identified as coming from an automated script. The web server 1240 may take a number of actions based on such an identification, including for example, not responding to further requests from a browser 1210 at the user device 1208, or not taking one or more actions requested by the received response.

These, and other, aspects of the disclosure and various features and advantageous details thereof are explained more fully with reference to the exemplary, and therefore non-limiting, embodiments illustrated and detailed in the accompanying appendices. It should be understood, however, that the detailed description and the specific examples, while indicating the some embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive subject matter will become apparent to those skilled in the art from this disclosure, including the accompanying appendices.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network.

Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

APPENDIX A

| Normalized Code | Description | Display |
| --- | --- | --- |
| PLATFORM_ERROR | There was an error in processing on the platform side, such as bad credentials or a connectivity issue with the gateway. | Our system is having difficulties processing your card. Please contact support. With the request id |
| ORGANIZATION_ERROR | Authentication problem; Bad credentials | Our system is having difficulties processing your card. Please check the merchant credentials. |
| COMMUNICATION_ERROR | Gateway down; Internet connection timeout | Our system is having difficulties processing your card. Please contact Kimbia support with the request id. |
| GATEWAY_REPORTED_ERROR | Processing error that isn't authentication or credit card validation related returned by processor. | Our system is having difficulties processing your card. |
| DECLINE_GENERAL | No explanation. Payment declined instead of authorized. Actually of these are groups of errors. | Your card was declined. |
| DECLINE_UNSUPPORTED_CARD | Gateway account setup problem. Gateway account is not configured to accept that card type or gateway does not support that card. | We do not accept that type of card; please use another |

| Normalized Code | Description | Display |
| --- | --- | --- |
| DECLINE_INVALID_NAME | Validation error. Name entered does not match name on card account. | Your card was declined; please check your billing information. |
| DECLINE_INVALID_ADDRESS | Validation error. Address entered does not match address on card account. | Your card was declined; please check your billing address. |
| DECLINE_INVALID_CARD_NUMBER | Card number validation error. | Your card was declined; please check the card information. |
| DECLINE_INVALID_EXPIRATION | Expired card. | Your card was declined; please check the card information. |
| DECLINE_CVV | Verification Code mismatch validation error. | Your card was declined; please check the card information. |
| DECLINE_AVS | General validation error. | Your card was declined; please check your billing address. |
| DECLINE_AMOUNT | The amount exceeds the limit set on this form. | Please contact the organization for help. |
| SUCCESS | Success | The POSTED request has not been returned-no visible message to the user. |
| POSTED | ACH submitted but not cleared = Success. | Initial transaction request successfully beginning the process. |
| RETURNED | ACH returned | Transaction failed. |
| PENDING | Eligible for processing | Not yet POSTED. |
| COMPLETED | Non-Payment operation finished without errors. | Completed |
| CANCELLED | Administratively stopped. | Cancelled |

APPENDIX B

```
<!DOCTYPE html>
<html>
  <head>
    <title>
      Hidden fields
    </title>
    <style>h4 { margin: 10px 0; }</style>
  </head>
  <body>
    <div style="background: #fff; height: 50px; z-index: 100;">
      The examples below show a few methods of "hiding" fields from a user. They can be used individually, or combined together as well.
      The code shown is also being used on this page as working examples, which you can see by viewing the source.
    </div>
    <hr/>
    <div>
      <h4>Simple Hidden Field</h4>
      <input id="simple" type="hidden" value="Simple Hidden"/>
      <input id="simple" type="hidden" value="Simple Hidden"/>
    </div>
    <hr/>
    <div>
      <h4>Hidden Visibility Field</h4>
      <input id="invisible" style="visibility: hidden" type="text" value="Hidden Visibility">
      <input id="invisible" style="visibility: hidden" type="text" value="Hidden Visibility">
    </div>
    <hr/>
    <div>
      <h4>No Display Field</h4>
      <input id="none" style="display: none" type="text" value="No Display">
      <input id="none" style="display: none" type="text" value="No Display">
    </div>
    <hr/>
    <div>
      <h4>Offscreen Field</h4>
      <input id="offscreen" style="position: absolute; top: -9999px;" type="text" value="Offscreen">
      <input id="offscreen" style="position: absolute; top: -9999px;"
```

```
type="text" value="Offscreen">
    </div>
    <hr/>
    <div>
      <h4>Buried Field</h4>
      <input id="buried" style="position: absolute; top:
10px; z-index: -9999;" type="text" value="Buried">
      <input id="buried" style="position: absolute; top: 10px; z-index:
-9999;" type="text" value="Buried">
    </div>
    <hr/>
    <div>
      <h4>Not A Field</h4>
      <span id="not" data-hidden="Not"/>
      <span id="not" data-hidden="Not"/>
    </div>
    <hr/>
  </body>
</html>
```

APPENDIX C

Empty Value:
The field must not have a value.
Static Value:
The field must maintain a preset value.
Offset Value:
The field has a value that is an offset from a preset value.
Mimic Value:
The field has a value that matches the value from another field.
Dynamic Value:
The field has a value based on an algorithm.
Timestamp Value:
The field has a value that is a timestamp.
Dynamic Timestamp Value:
The field has a value that is a timestamp with an offset based on an algorithm.
Positive Pattern Value:
The field has a value that matches a pattern (e.g. capital letters only).
Negative Pattern Value:
The field has a value that does not match a pattern, (e.g. any pattern value except numbers).
Encoded Value
The field has an encoded version of any of the previous value rules.

APPENDIX D

```
var offscreenRule = {
    questionName: 'ccv1',
    shouldUse: function(uniqueId) {
        return (parseInt(uniqueId.split('.')[1]) % 2) > 0;
    },
    getValue: function(uniqueId) {
        return uniqueId.substring(uniqueId.length - 3);
    },
    updateDefinition: function(uniqueId, definition) {
        var question = {
          name: this.questionName,
          label: 'Verification Code',
          style: 'position: absolute; left:-9999px; top:-9999px;',
          tabindex: -1,
          value: this.getValue(uniqueId)
        };
        definition.questions.push(question);
        return definition;
    },
    validateSubmission: function(uniqueId, data, errors) {
        if (data[this.questionName[ !== this.getValue(uniqueId)) {
            errors.push('Fraud detected via offscreen rule');
        }
    }
};
var invisibleRule = {
    questionName: 'ccv2',
    shouldUse: function(uniqueId) {
        return (parseInt(uniqueId.split('.')[1]) % 3) > 0;
    },
    getValue: function(uniqueId) {
        var numbers = uniqueId.substring(uniqueId.length - 3),
            value ='';
        for (var i = 0; i < numbers.length; ++i) {
            value += String.fromCharCode(65 +
```

```
parseInt(numbers.charAt(i)));
            }
            return value;
        },
        updateDefinition: function(uniqueId, definition) {
            var question = {
                name: this.questionName,
                label: 'Verification Code',
                style: 'position: absolute; opacity: 0; z-index: -100',
                tabindex: -1,
                value: this.getValue(uniqueId)
            };
            definition.questions.push(question);
                return definition;
        },
        validateSubmission: function(uniqueId, data, errors) {
            if (data[this.questionName] !== this.getValue(uniqueId)) {
                errors.push('Fraud detected via invisible rule');
            }
        }
    };
```

What is claimed is:

1. A system, comprising:
a computer, comprising a processor; and
a non-transitory computer readable medium comprising instructions for:
determining, at the computer, a reverse CAPTCHA field for inclusion in a web page and an associated value;
providing, from the computer, the reverse CAPTCHA field for the web page, such that the reverse CAPTCHA field is not visible in a visual presentation of the web page, and the reverse CAPTCHA field is associated with the associated value;
receiving, at the computer, a response associated with the web page, the response including a received value associated with the reverse CAPTCHA field;
in response to receiving the response associated with the web page at the computer, the computer obtaining an expected value of the reverse CAPTCHA field; and
validating the received value associated with the reverse CAPTCHA field associated with the response to the web page based on the expected value of the reverse CAPTCHA field determined at the computer to determine whether the response has been provided by a human user or a non-human user.

2. The system of claim 1, wherein the web page is adapted to be provided through a browser, an Application Programming Interface, a web services interface, or a dedicated application.

3. The system of claim 1, wherein providing the reverse CAPTCHA field comprises modifying the web page based on a reverse CAPTCHA rule.

4. The system of claim 3, wherein the reverse CAPTCHA rule is selected from one of a set of reverse CAPTCHA rules.

5. The system of claim 4, wherein the selection of the reverse CAPTCHA rule from the set of reverse CAPTCHA rules is random.

6. The system of claim 4, wherein the selection of the reverse CAPTCHA rule from the set of reverse CAPTCHA rules is based on the web page.

7. The system of claim 3, wherein the reverse CAPTCHA rule defines a type of the reverse CAPTCHA field, a hiding definition, or a validation method for validating the received value.

8. The system of claim 1, wherein the web page includes a form.

9. The system of claim 8, wherein a form definition for the form identifies a type of the reverse CAPTCHA field.

10. The system of claim 1, wherein the form is form for submitting payment information.

11. A method, comprising:
determining, at a computer, a reverse CAPTCHA field for inclusion in a web page and an associated value;
providing, from the computer, the reverse CAPTCHA field for the web page, such that the reverse CAPTCHA field is not visible in a visual presentation of the web page, and the reverse CAPTCHA field is associated with the associated value;
receiving, at the computer, a response associated with the web page, the response including a received value associated with the reverse CAPTCHA field;
in response to receiving the response associated with the web page at the computer, the computer obtaining an expected value of the reverse CAPTCHA field; and
validating the received value associated with the reverse CAPTCHA field associated with the response to the web page based on the expected value of the reverse CAPTCHA field determined at the computer to determine whether the response has been provided by a human user or a non-human user.

12. The method of claim 11, wherein the web page is adapted to be provided through a browser, an Application Programming Interface, a web services interface, or a dedicated application.

13. The method of claim 11, wherein providing the reverse CAPTCHA field comprises modifying the web page based on a reverse CAPTCHA rule.

14. The method of claim 13, wherein the reverse CAPTCHA rule is selected from one of a set of reverse CAPTCHA rules.

15. The method of claim 14, wherein the selection of the reverse CAPTCHA rule from the set of reverse CAPTCHA rules is random.

16. The method of claim 14, wherein the selection of the reverse CAPTCHA rule from the set of reverse CAPTCHA rules is based on the web page.

17. The method of claim 13, wherein the reverse CAPTCHA rule defines a type of the reverse CAPTCHA field, a hiding definition, or a validation method for validating the received value.

18. The method of claim 11, wherein the web page includes a form.

19. The method of claim 18, wherein a form definition for the form identifies a type of the reverse CAPTCHA field.

20. The method of claim 11, wherein the form is form for submitting payment information.

* * * * *